US012777145B2

(12) United States Patent
Yoo et al.

(10) Patent No.: US 12,777,145 B2
(45) Date of Patent: Oct. 27, 2026

(54) INTRA-PREDICTION METHOD AND DEVICE BASED ON INTRA-PREDICTION MODE DERIVATION

(71) Applicant: LG Electronics Inc., Seoul (KR)

(72) Inventors: Sunmi Yoo, Seoul (KR); Hyeongmoon Jang, Seoul (KR); Jangwon Choi, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/725,434

(22) PCT Filed: Dec. 30, 2022

(86) PCT No.: PCT/KR2022/021733
§ 371 (c)(1),
(2) Date: Jun. 28, 2024

(87) PCT Pub. No.: WO2023/128703
PCT Pub. Date: Jul. 6, 2023

(65) Prior Publication Data

US 2025/0184481 A1 Jun. 5, 2025

Related U.S. Application Data

(60) Provisional application No. 63/295,508, filed on Dec. 30, 2021.

(51) Int. Cl.
*H04N 19/593* (2014.01)
*H04N 19/11* (2014.01)
(Continued)

(52) U.S. Cl.
CPC ........... *H04N 19/11* (2014.11); *H04N 19/159* (2014.11); *H04N 19/176* (2014.11); *H04N 19/593* (2014.11)

(58) Field of Classification Search
CPC .... H04N 19/11; H04N 19/159; H04N 19/176; H04N 19/593
(Continued)

(56) References Cited

U.S. PATENT DOCUMENTS

2020/0145668 A1 5/2020 Kotra et al.
2021/0360231 A1* 11/2021 Heo ...................... H04N 19/11
(Continued)

FOREIGN PATENT DOCUMENTS

KR 10-2018-0084664 A 7/2018
KR 10-2020-0056451 A 5/2020
(Continued)

OTHER PUBLICATIONS

International Search Report and Written Opinion in International Appln. No. PCT/KR2022/021733, mailed on Apr. 6, 2023, 15 pages (with English translation).
(Continued)

*Primary Examiner* — Albert Kir
(74) *Attorney, Agent, or Firm* — Fish & Richardson P.C.

(57) ABSTRACT

According to the present disclosure, a method by which a decoding device decodes an image comprises the steps of: acquiring a bit-stream including image information; deriving a decoder-side intra mode derivation (DIMD) mode for the current block; deriving an intra-prediction mode for the current block; generating prediction samples for the current block on the basis of the intra-prediction mode for the current block; and generating reconstructed samples for the current block on the basis of the prediction samples for the current block, wherein the intra-prediction mode for the current block is derived on the basis of whether the DIMD mode is applied to the current block.

14 Claims, 15 Drawing Sheets

(51) Int. Cl.
*H04N 19/159* (2014.01)
*H04N 19/176* (2014.01)

(58) Field of Classification Search
USPC .................................................... 375/240.12
See application file for complete search history.

(56) References Cited

U.S. PATENT DOCUMENTS

| | | | | |
|---|---|---|---|---|
| 2024/0357077 A1* | 10/2024 | Li | .......................... | H04N 19/70 |
| 2025/0392702 A1* | 12/2025 | Xu | ........................ | H04N 19/107 |
| 2026/0006176 A1* | 1/2026 | Deng | .................... | H04N 19/105 |

FOREIGN PATENT DOCUMENTS

| | | | | | |
|---|---|---|---|---|---|
| KR | 10-2021-0134407 A | | 11/2021 | | |
| WO | WO-2017192995 A1 | * | 11/2017 | ........... | H04N 19/176 |
| WO | WO-2018070790 A1 | * | 4/2018 | ........... | H04N 19/182 |
| WO | WO-2022260339 A1 | * | 12/2022 | ........... | H04N 19/147 |
| WO | WO-2022260341 A1 | * | 12/2022 | ............. | H04N 19/44 |
| WO | WO-2023277535 A1 | * | 1/2023 | ........... | H04N 19/159 |
| WO | WO-2025002781 A1 | * | 1/2025 | ........... | H04N 19/593 |
| WO | WO-2025015024 A1 | * | 1/2025 | ........... | H04N 19/182 |

OTHER PUBLICATIONS

Wang et al., "EE2-related: Template-based intra mode derivation using MPMs," JVET-V0098-v2, Joint Video Experts Team (JVET) of ITU-T SG 16 WP 3 and ISO/IEC JTC 1/SC 29, Meeting #22, Teleconference, Apr. 20 -28, 2021, 4 pages.

Extended European Search Report in European Appln. No. 22916844.8, mailed on Oct. 6, 2025, 14 pages.

Xiu et al., "Decoder-side Intra Mode Derivation for Block-based Video Coding," Paper, Presented at the Proceedings of the Picture Coding Symposium (PCS), Nuremberg, Germany, Dec. 4-7, 2016, 5 pages.

Yoo et al., "EE2-related : Clean-up on DIMD," Joint Video Experts Team (JVET) of ITU-T SG 16 WP 3 and ISO/IEC JTC 1/SC 29, 25th Meeting, by teleconference, JVET-Y0131, Jan. 2022, 9 pages.

Yoo et al., "EE2-related : Clean-up on DIMD," Joint Video Experts Team (JVET) of ITU-T SG 16 WP 3 and ISO/IEC JTC 1/SC 29, 25th Meeting, by teleconference, JVET-Y0131-v2, Jan. 2022, 4 pages.

Zhao et al., "EE2-Related: Improvements of Decoder-Side Intra Mode Derivation," Joint Video Experts Team (JVET) of ITU-T SG 16 WP 3 and ISO/IEC JTC 1/SC 29, 22nd Meeting, by teleconference, JVET-V0087, Apr. 2021, 6 pages.

* cited by examiner

INTRA-PREDICTION METHOD AND DEVICE BASED ON INTRA-PREDICTION MODE DERIVATION

CROSS-REFERENCE TO RELATED APPLICATIONS

This application is a National Stage application under 35 U.S.C. § 371 of International Application No. PCT/KR2022/021733, filed on Dec. 30, 2022, which claims the benefit of U.S. Provisional Application No. 63/295,508, filed on Dec. 30, 2021. The disclosures of the prior applications are incorporated by reference in their entirety.

BACKGROUND OF THE DISCLOSURE

Field of the Disclosure

The present disclosure relates to an image coding technology and, most particularly, to a method and apparatus for coding an intra prediction mode in an image coding system.

Related Art

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image compression technique is required to effectively compress and transmit, store, or play high resolution, high quality video/image showing various characteristics as described above.

Additionally, a technology for reducing quantity of information and amount of bits that are transmitted during a process of signaling data for an intra prediction mode is required.

SUMMARY OF THE DISCLOSURE

Technical Solutions

According to an embodiment of the present disclosure, provided herein is an image decoding method performed by a decoding apparatus. The decoding method includes the steps of obtaining a bitstream including image information, deriving a Decoder Side Intra Mode Derivation (DIMD) mode for a current block, deriving an intra prediction mode for the current block, generating prediction samples for the current block based on the intra prediction mode for the current block, and generating reconstructed samples for the current block based on the prediction samples for the current block, wherein the intra prediction mode for the current block is derived based on whether or not the DIMD mode is applied to the current block.

According to another embodiment of the present disclosure, provided herein is an image encoding method performed by an encoding apparatus. The encoding method includes the steps of deriving a Decoder Side Intra Mode Derivation (DIMD) mode for a current block, determining an intra prediction mode for the current block, generating prediction samples for the current block based on the intra prediction mode for the current block, generating prediction related information based on the prediction samples for the current block, and encoding image information including the prediction related information, wherein the intra prediction mode for the current block is determined based on whether or not the DIMD mode is applied to the current block.

According to yet another embodiment of the present disclosure, provided herein is a computer readable digital recording medium. The digital recording medium stores a bitstream that is generated by a specific method, wherein the specific method includes the steps of deriving a Decoder Side Intra Mode Derivation (DIMD) mode for a current block, determining an intra prediction mode for the current block, generating prediction samples for the current block based on the intra prediction mode for the current block, generating prediction related information based on the prediction samples for the current block, and encoding image information including the prediction related information, wherein the intra prediction mode for the current block is determined based on whether or not the DIMD mode is applied to the current block.

According to yet another embodiment of the present disclosure, provided herein is a transmitting method of data for an image. The transmitting method includes the steps of generating a bitstream based on the steps of deriving a Decoder Side Intra Mode Derivation (DIMD) mode for a current block, determining an intra prediction mode for the current block, generating prediction samples for the current block based on the intra prediction mode for the current block, generating prediction related information based on the prediction samples for the current block, and encoding image information including the prediction related information, and transmitting the data including the bitstream, wherein the intra prediction mode for the current block is determined based on whether or not the DIMD mode is applied to the current block.

According to yet another embodiment of the present disclosure, provided herein is a computer readable digital recording medium having encoded information or encoded video/image information stored therein that allows a video/image decoding method, which is disclosed in at least one of the embodiments of the present disclosure, to be performed by a decoding apparatus.

According to yet another embodiment of the present disclosure, provided herein is a transmitting method and transmitting apparatus for a bitstream that is generated according to an video/image encoding method, which is disclosed in at least one of the embodiments of the present disclosure.

DESCRIPTION OF EXEMPLARY EMBODIMENTS

Figure 1:
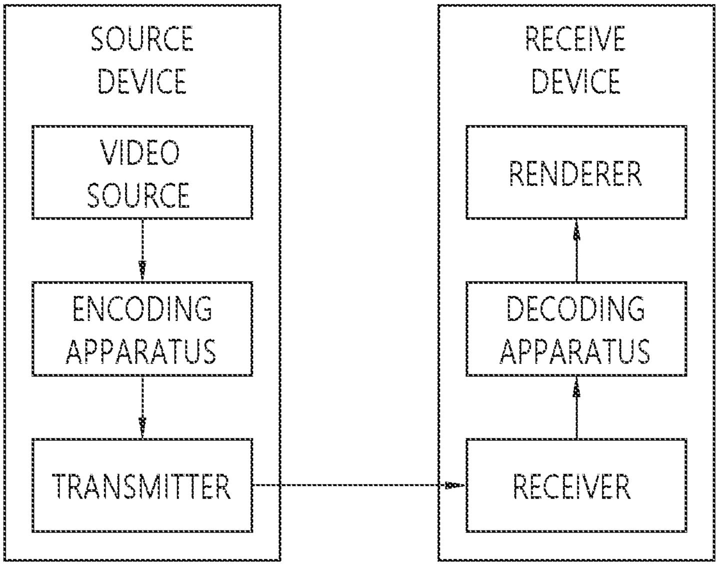
FIG. 1 schematically illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Present disclosure relates to video/image coding. For example, the methods/embodiments disclosed in the present disclosure may be related to the versatile video coding (VVC) standard (ITU-T Rec. H.266), the next-generation video/image coding standard after VVC, or other video coding related standards (for example, the High Efficiency Video Coding (HEVC) standard (ITU-T Rec. H.265), essential video coding (EVC) standard, AVS2 standard, etc.).

Present disclosure relates to video/image coding. For example, the methods/embodiments disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A". "only B" or "both A and B". In other words, in the present specification. "A or B" may be interpreted as "A and/or B". For example. "A, B or C" herein means "only A", "only B". "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A. B. or C".

In the present description, "at least one of A and B" may mean "only A". "only B", or "both A and B". In addition, in the present description, the expression "at least one of A or B" or "at least one of A and/or B" may be interpreted the same as "at least one of A and B".

In addition, in the present description. "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated. "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

FIG. 1 schematically illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
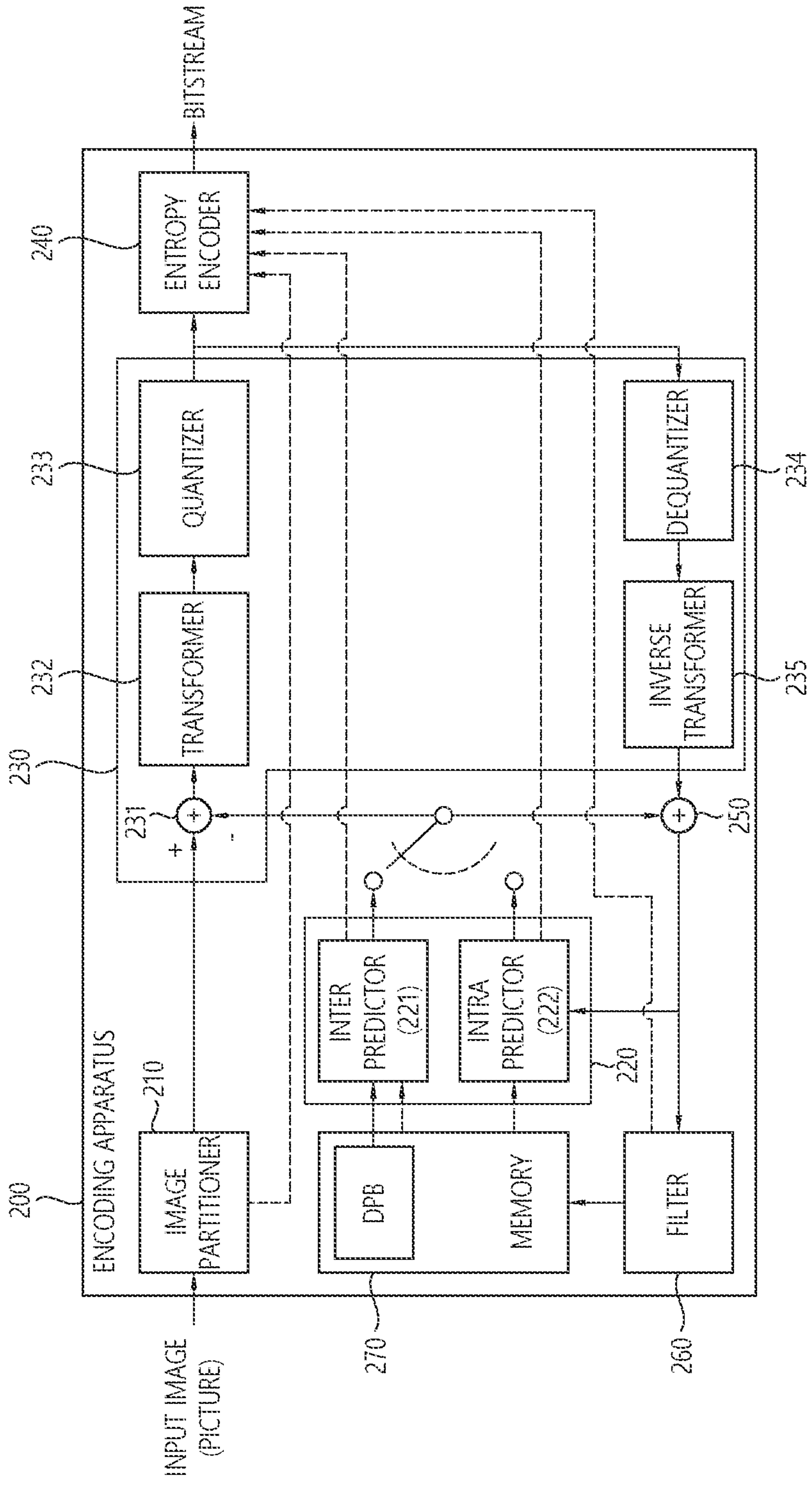
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding process according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a process of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the subtractor 231, a prediction signal (predicted block, prediction samples or prediction sample array) output from the predictor 220 is subtracted from an input image signal (original block, original samples or original sample array) to generate a residual signal (residual block, residual samples or residual sample array), and the generated residual signal is transmitted to the transformer 232. The predictor 220 may perform prediction on a block to be processed (hereinafter, referred to as a current block) and generate a predicted block including prediction samples for the current block. The predictor 220 may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) prediction mode. The IBC, for example, may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure.

The prediction signal generated by the inter predictor 221 and/or the intra predictor 222 may be used to generate a reconstructed signal or to generate a residual signal. The transformer 232 may generate transform coefficients by applying a transform technique to the residual signal. For example, the transform technique may include a discrete cosine transform (DCT), a discrete sine transform (DST), a graph-based transform (GBT), or a conditionally non-linear transform (CNT), etc. Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to non-square pixel blocks each having a different size.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NAL (network abstraction layer) unit in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements to be described later may be encoded through the above-described encoding process and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed sample array). If there is no residual for the block to be processed, such as a case where the skip mode is applied, the predicted block may be used as the reconstructed block. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset (SAO), an adaptive loop filter, a bilateral filter, and the like. The filter 260 may generate various information related to the filtering and transmit the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as the reference picture in the inter predictor 260. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
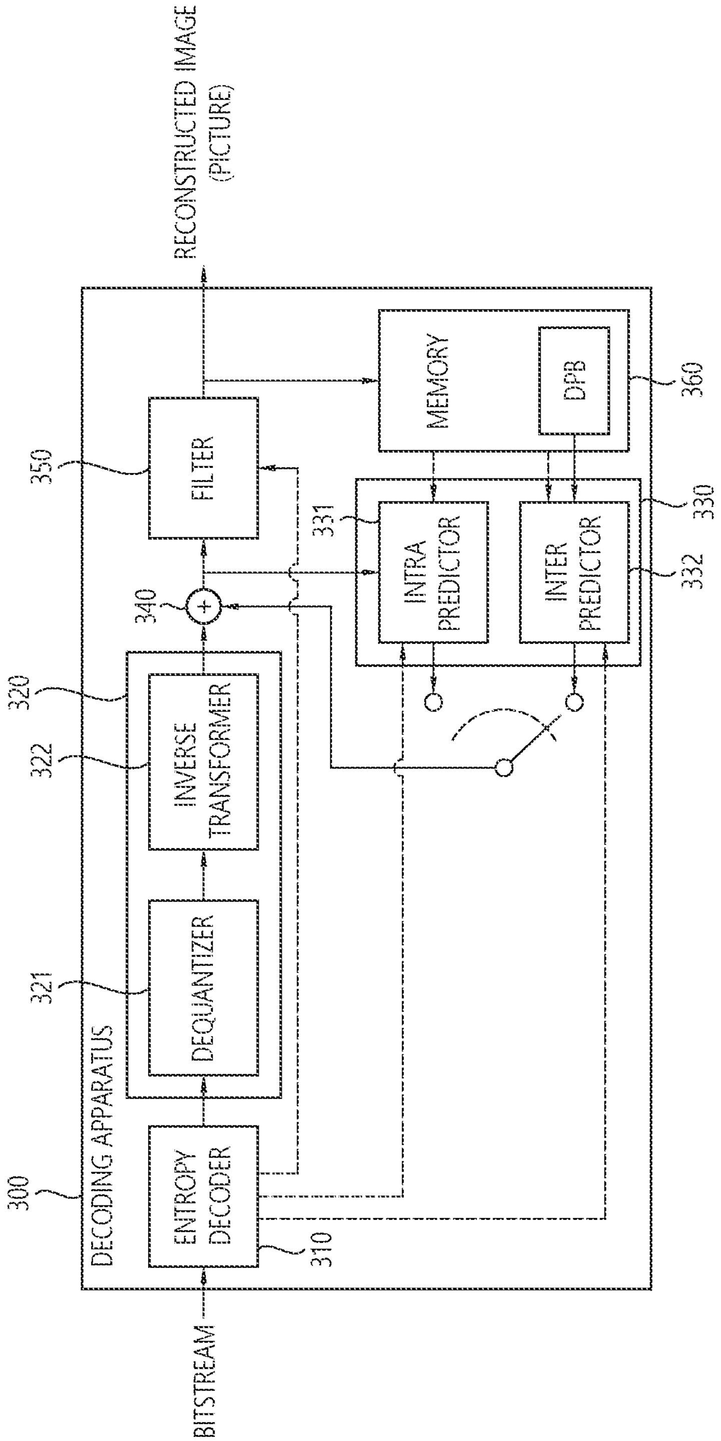
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 333 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding process and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding was performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The IBC may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure.

The intra predictor 332 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 332 may determine the prediction mode applied to the current block by using a prediction mode applied to a neighboring block.

The inter predictor 331 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 331 may configure a motion information candidate list based on neighboring blocks and derive a motion rector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture that have already been reconstructed. The stored motion information may be transmitted to the inter predictor 331 so as to be utilized as the motion information of the spatial neighboring block or the motion information of the temporal neighboring block. The memory 360 may store reconstructed samples of reconstructed blocks in the current picture and transfer the reconstructed samples to the intra predictor 332.

In this specification, the embodiments described in the predictor 330, the dequantizer 321, the inverse transformer 322, and the filter 350 of the decoding apparatus 300 may be applied to the same or correspond to the predictor 220, the dequantizer 234, the inverse transformer 235, and the filter 260 of the encoding apparatus 200 respectively.

As described above, in performing video coding, prediction is performed to increase compression efficiency. Through this, it is possible to generate a predicted block including prediction samples for the current block, which is a block to be coded. Here, the predicted block includes prediction samples in the spatial domain (or pixel domain). The predicted block is derived in the same way from an encoding apparatus and a decoding apparatus, and the encoding apparatus can increase image coding efficiency by signaling information (residual information) between the original block and the predicted block to the decoding apparatus, not the original sample value of the original block itself. The decoding apparatus can derive a residual block containing residual samples based on the above residual information, combine the above residential block with the above predicted block to create a restore block containing restoration samples, and create a restore picture containing restoration blocks.

The residual information may be generated through a transform and quantization process. For example, the encoding apparatus may derive a residual block between the original block and the predicted block, derive transform coefficients by performing the transform process on the residual samples (residual sample array) included in the residual block, derive quantized transform coefficients by performing the quantization process on the transform coefficients, and signaling related residual information (through a bitstream) to the decoding apparatus. Here, the residual information may include information such as value information, position information, transform technique, transform kernel, quantization parameter of the quantized transform coefficients, etc. The decoding apparatus may perform a dequantization/inverse transform process based on the residual information and derive residual samples (or residual blocks). The decoding apparatus may generate a reconstructed picture based on the predicted block and the residual block. The encoding apparatus may also derive a residual block by dequantizing/inverse transforming quantized transform coefficients for reference to the inter-prediction of the picture, and generate a reconstructed picture based on this.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

In this document, quantized transform coefficients and transform coefficients may be referred to as transform coefficients and scaled transform coefficients, respectively. In this case, the residual information may include information on transform coefficient(s), and the information on the transform coefficient(s) may be signaled through residual coding syntax. Transform coefficients may be derived based on the residual information (or information about the transform coefficient(s)), and scaled transform coefficients may be derived through inverse transform (scaling) of the transform coefficients. Residual samples may be derived based on an inverse transform (transform) to the scaled transform coefficients. This may be applied/expressed in other parts of this document as well.

A predictor of the encoding apparatus/decoding apparatus may derive prediction samples by performing inter prediction on a block-by-block basis. Inter prediction can be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector in a reference picture indicated by a reference picture index. In this case, in order to reduce the amount of motion information transmitted in the inter-prediction mode, motion information of the current block may be predicted in units of blocks, subblocks, or samples based on correlation of motion information between neighboring blocks and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block present in the current picture and a temporal neighboring block present in the reference picture. A reference picture including the reference block and a reference picture including the temporal neighboring block may be the same or different. The temporal neighboring block may be called a collocated reference block, a collocated CU (colCU), and the like, and a reference picture including the temporal neighboring block may be called a collocated picture (colPic). For example, a motion information candidate list may be constructed based on neighboring blocks of the current block, and a flag or index information indicating which candidate is selected (used) to derive the motion vector and/or reference picture index of the current block may be signaled. Inter prediction may be performed based on various prediction modes. For example, in the case of skip mode and merge mode, motion information of a current block may be the same as motion information of a selected neighboring block. In the case of the skip mode, the residual signal may not be transmitted unlike the merge mode. In the case of a motion vector prediction (MVP) mode, a motion vector of a selected neighboring block is used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called Bi prediction. Here, the L0 motion vector may indicate a motion vector related to the reference picture list L0 (L0), and the L1 motion vector may indicate a motion vector related to the reference picture list L1 (L1). The reference picture list L0 may include pictures prior to the current picture in output order as reference pictures, and the reference picture list L1 may include pictures subsequent to the current picture in output order. The previous pictures may be referred to as forward (reference) pictures, and the subsequent pictures may be referred to as backward (reference) pictures. The reference picture list L0 may further include subsequent pictures in an output order as reference pictures than the current picture. In this case, the previous pictures in the reference picture list L0 may be indexed first, and the later pictures may be indexed next. The reference picture list L1 may further include, as reference pictures, pictures previous to the current picture in output order. In this case, the subsequent pictures in the reference picture list 1 may be indexed first, and the previous pictures may be indexed next. Here, the output order may correspond to a picture order count (POC) order.

Figure 4:
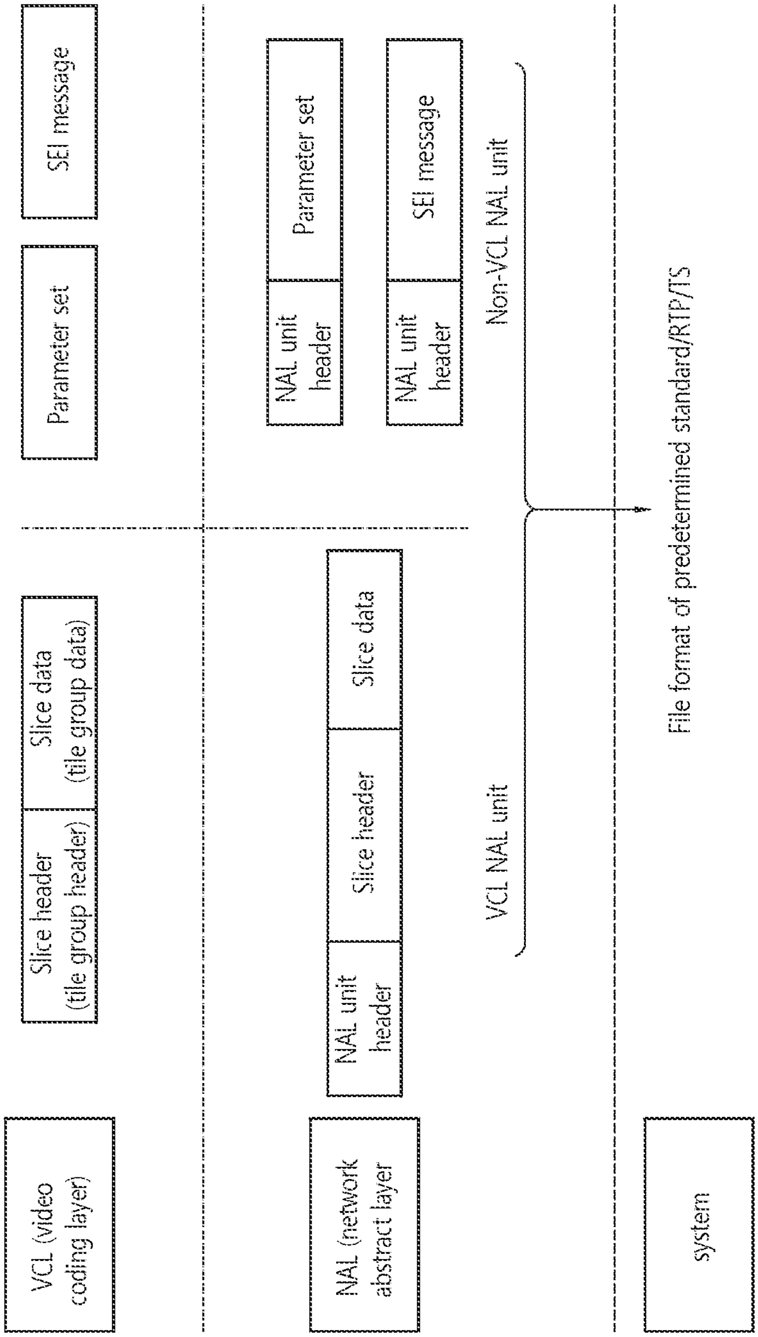
FIG. 4 schematically shows a hierarchical structure for coded video/image.

FIG. 4 exemplarily illustrates a layer structure for a coded video/image.

Referring to FIG. 4, a coded video/image is divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

VCL data including compressed image data (slice data), or a parameter set including a picture parameter set (PPS), a sequence parameter set (SPS), or a video parameter set (VPS), or a supplemental enhancement information (SEI) message additionally required in an image decoding process may be generated, in the VCL.

In the NAL, header information (NAL unit data) is added to a raw byte sequence payload (RSRP) generated in the VCL to generate the NAL unit. In here, the RBSP refers to the slice data, the parameter set, the SEI message, etc., generated in the VCL. The NAL unit header may include NAL unit type information specified according to RSRP data included in the corresponding NAL unit.

As illustrated in the figure above, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

- Adaptation Parameter Set (APS) NAL unit: Type for the NAL unit including the APS
- Video Parameter Set (VPS) NAL unit: Type for the NAL unit including the VPS
- Sequence Parameter Set (SPS) NAL unit: Type for the NAL unit including the SPS
- Picture Parameter Set (PPS) NAL unit: Type for the NAL unit including the PPS
- Decoding Capability Information (DCI) NAL unit: Type for the NAL unit including the DCI
- Picture header (PH) NAL unit: Type for the NAL unit including the PH The above-described NAL unit types have syntax information for the NAL unit type, and the syntax information may be stored in a NAL unit header and signaled. For example, the syntax information may be nal_unit_type, and NAL unit types may be specified with a nal_unit_type value.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. In this document, slices may be mixed or replaced with tile groups. Also, in this document, the slice header may be mixed or replaced with type group headers.

The slice header (slice header syntax, slice header information) may include information/parameters commonly applicable to the slice. The APS (APS Syntax) or PPS (PPS Syntax) may include information/parameters commonly applicable to one or more slices or pictures. The SPS (SPS Syntax) may include information/parameters commonly applicable to one or more sequences. The VPS (VPS syntax) may include information/parameters commonly applicable to multiple layers. The DCI (DCI syntax) may include information/parameters commonly applicable to overall video. The DCI may include information/parameters related to decoding capability. In this document, high level syntax (HLS) may include at least one of the APS syntax, PPS syntax, SPS syntax, VPS syntax. DCI syntax, picture header syntax, or slice header syntax.

In this document, image/video information encoded from an encoding apparatus to a decoding apparatus and signaled in the form of a bitstream includes not only intra-picture partitioning related information, intra/inter prediction information, residual information, in-Joop filtering information, and the like, but also information included in the slice header, information included in the picture header, information included in the APS, information included in the PPS, information included in an SPS, information included in a VPS, and/or information included in a DCI. Also, the image/video information may further include NAL unit header information.

Meanwhile, when intra prediction is performed, correlation between samples may be used and a difference between an original block and a prediction block, that is, a residual may be obtained. The above-described transform and quantization may be applied to the residual, through this, spatial redundancy may be removed. Hereinafter, an encoding method and a decoding method using intra prediction will be described in detail.

Intra prediction refers to prediction that generates prediction samples for a current block based on reference samples outside the current block in a picture including the current block (hereinafter referred to as the current picture). Here, reference samples outside the current block may refer to samples positioned around the current block. When intra prediction is applied to the current block, neighboring reference samples to be used for intra prediction of the current block may be derived.

For example, when the size (width×height) of the current block is nW×nH, the neighboring reference samples of the current block may include a total of 2×nH samples including samples adjacent to the left boundary of the current block and samples neighboring to the bottom-left of the current block, a total of 2×nW samples including samples adjacent to the top boundary and samples neighboring to the top-right current block, and 1 sample adjacent to the top-left of the current block. Alternatively, the neighboring reference samples of the current block may include samples top neighboring samples in a plurality of columns and left neighboring samples in a plurality of rows. In addition, the neighboring reference samples of the current block may include a total of nH samples adjacent to the right boundary of the current block of size nW×nH, a total of nW samples adjacent to the bottom boundary of the current block of size nW×nH, and 1 sample neighboring to the bottom-right of the current block of size nW×nH.

However, some of the neighboring reference samples of the current block may not be decoded yet or may not be available. In this case, the decoding apparatus may configure neighboring reference samples to be used for prediction by substituting unavailable samples with available samples. Alternatively, neighboring reference samples to be used for prediction may be configured through interpolation of available samples.

When the neighboring reference samples are derived. (i) a prediction sample may be derived based on the average or interpolation of the neighboring reference samples of the current block, and (ii) a prediction sample may be derived based on a reference sample existing in a specific (prediction) direction with respect to the prediction sample among neighboring reference samples of the current block. Case (i) may be applied when the intra prediction mode is a non-directional mode or non-angular mode, and case (ii) may be applied when the intra prediction mode is a directional mode or an angular mode.

In addition, through interpolation between a first neighboring sample located in a prediction direction of the intra prediction mode of the current block based on the prediction sample of the current block among the neighboring reference samples and a second neighboring sample located in the opposite direction of the prediction direction, the prediction sample may be generated. The above case may be called linear interpolation intra prediction (LIP). Also, chroma prediction samples may be generated based on luma samples using a linear model. This case can be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

A reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra sub-partitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, or ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Meanwhile, in addition to the above-described intra prediction types, matrix based intra prediction (MIP) may be used as one method for intra prediction. MIP may be referred to as affine linear weighted intra prediction (ALWIP) or matrix weighted intra prediction (MIP).

If the MIP is applied to the current block, i) using neighboring reference samples on which an averaging process has been performed, ii) matrix-vector-multiplication process is performed, and iii) a horizontal/vertical interpolation process may be further performed to derive prediction samples for the current block as necessary. The intra prediction modes used for the MIP may be configured to be different from the intra prediction modes used in the LIP, PDPC, MRL. ISP intra prediction or normal intra prediction.

The intra prediction mode for MIP may be called "affine linear weighted intra prediction mode" or matrix-based intra prediction mode. For example, a matrix and an offset used in matrix vector multiplication may be set differently according to the intra prediction mode for the MIP. Here, the matrix may be referred to as an (affine) weight matrix, and the offset may be referred to as an (affine) offset vector or an (affine) bias vector. In this document, intra prediction mode for MIP may be called MIP intra prediction mode, linear weighted intra prediction mode, matrix weighted intra prediction mode, or matrix based intra prediction mode. A specific MIP method will be described later.

The following drawings are prepared to explain specific examples of this document. Since the names of specific devices or specific terms or names (eg, names of syntaxes) described in the drawings are provided as examples, the technical features of this document are not limited to the specific names used in the drawings below.

Figure 5:
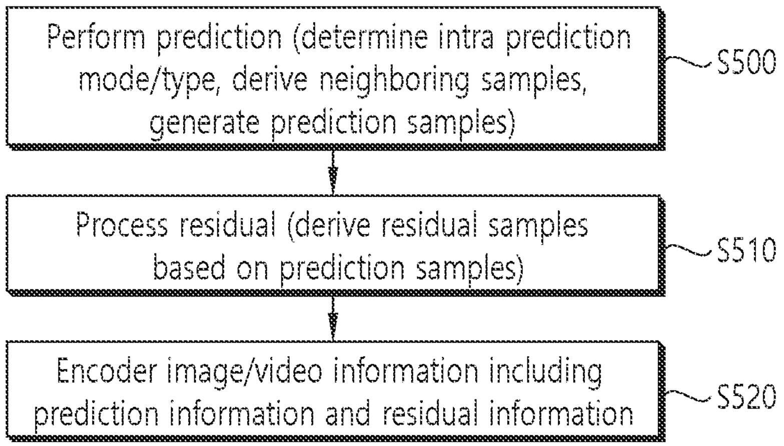
FIG. 5 schematically illustrates an example of an image encoding method based on intra prediction to which embodiments of the present disclosure may be applied.
Figure 6:
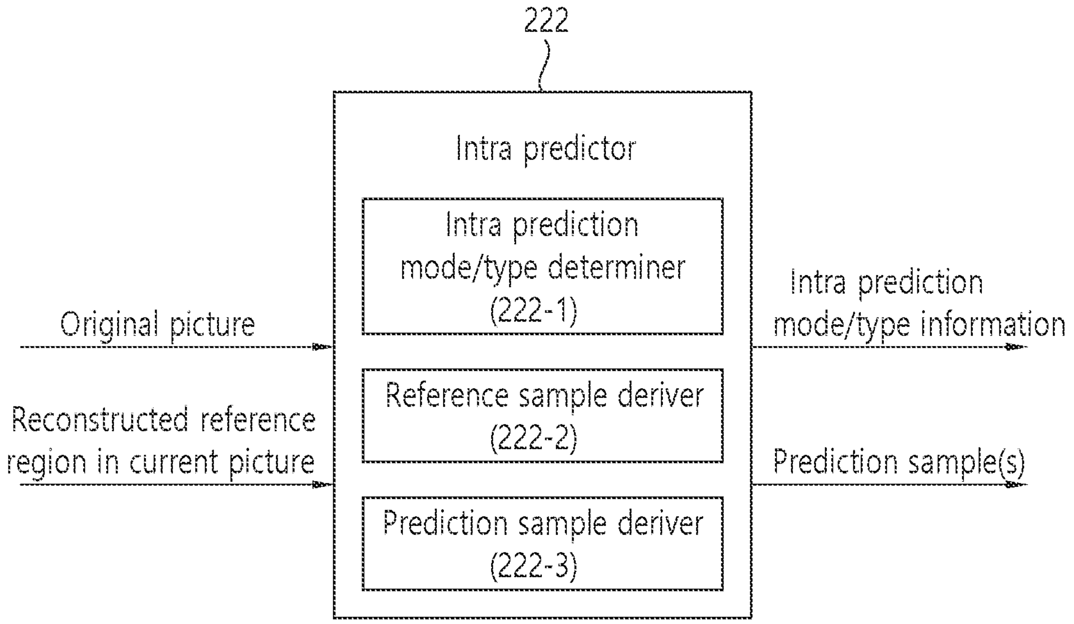
FIG. 6 schematically illustrates an intra predictor in an encoding apparatus.

FIG. 5 schematically illustrates an example of an image encoding method based on intra prediction to which embodiments of the present disclosure may be applied, and FIG. 6 schematically illustrates an intra predictor in an encoding apparatus. The intra predictor in the encoding apparatus of FIG. 6 may be applied to the same or corresponding to the intra predictor 222 of the encoding apparatus 200 of FIG. 2 described above.

Referring to FIGS. 5 and 6, S500 may be performed by the intra predictor 222 of the encoding apparatus, and S510 may be performed by the residual processor 230 of the encoding apparatus. Specifically. S510 may be performed by the subtractor 231 of the encoding apparatus. In S520, prediction information may be derived by the intra predictor 222 and encoded by the entropy encoder 240. In S520, residual information may be derived by the residual processor 230 and encoded by the entropy encoder 240. The residual information is information about residual samples. The residual information may include information about quantized transform coefficients of residual samples. As described above, the residual samples may be derived as transform coefficients through a transformer of the encoding apparatus, and the transform coefficients may be derived as quantized transform coefficients through a quantizer. Information about quantized transform coefficients may be encoded in the entropy encoder 240 through a residual coding process.

The encoding apparatus performs intra prediction on the current block (S500). The encoding apparatus may derive an intra prediction mode/type for the current block, derive neighboring reference samples of the current block, and generate prediction samples within the current block based on the intra prediction mode/type and the neighboring reference samples. Here, intra prediction mode/type determination, neighboring reference samples derivation, and prediction samples generation process may be performed simultaneously, or one process may be performed prior to another process.

For example, the intra predictor 222 of the encoding apparatus may include an intra prediction mode/type determiner 222-1, a reference sample deriver 222-2, and a prediction sample deriver 222-3. The intra prediction mode/type determiner 222-1 determines the intra prediction mode/type for the current block, the reference sample deriver 222-2 derives neighboring reference samples of the current block, and the prediction sample deriver 222-3 may derive prediction samples of the current block. Meanwhile, although not shown, when a prediction sample filtering process is performed, the intra predicter 222 may further include a prediction sample filter (not shown). The encoding apparatus may determine a mode/type applied to the current block from among a plurality of intra prediction modes/types. The encoding apparatus may compare RD costs for intra prediction modes/types and determine an optimal intra prediction mode/type for the current block.

As described above, the encoding apparatus may perform a prediction sample filtering process. Prediction sample filtering may be referred to as post filtering. Some or all of the prediction samples may be filtered through the prediction sample filtering process. In some cases, the prediction sample filtering process may be omitted.

The encoding apparatus generates residual samples for the current block based on the (filtered) prediction samples (S510). The encoding apparatus may compare prediction samples from original samples of the current block based on phase and derive residual samples.

The encoding apparatus may encode image information including intra prediction information (prediction information) and residual information about residual samples (S520). Prediction information may include intra prediction mode information and intra prediction type information. Residual information may include residual coding syntax. The encoding apparatus may transform/quantize the residual samples to derive quantized transform coefficients. The residual information may include information about the quantized transform coefficients.

The encoding apparatus may output encoded image information in the form of a bitstream. The output bitstream may be delivered to a decoding apparatus through a storage medium or network.

As described above, the encoding apparatus may generate a reconstructed picture (including reconstructed samples and a reconstructed block). To this end, the encoding apparatus may derive (modified) residual samples by dequantizing/inverse transforming the quantized transform coefficients again. The reason for performing dequantization/inverse transformation after transforming/quantizing the residual samples in this way is to derive the same residual samples as the residual samples derived from the decoding apparatus as described above. The encoding apparatus may generate a reconstructed block including reconstructed samples for the current block based on prediction samples and (modified) residual samples. A reconstructed picture for a current picture may be generated based on the reconstructed block. As described above, an in-loop filtering process or the like may be further applied to the reconstructed picture.

Figure 7:
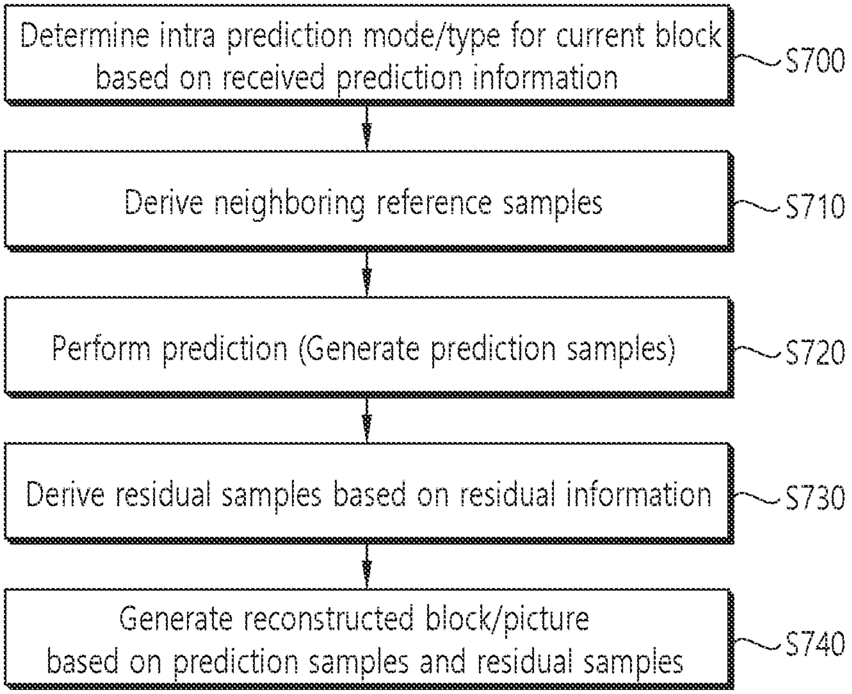
FIG. 7 schematically illustrates an example of an image decoding method based on intra prediction to which embodiments of the present disclosure may be applied.
Figure 8:
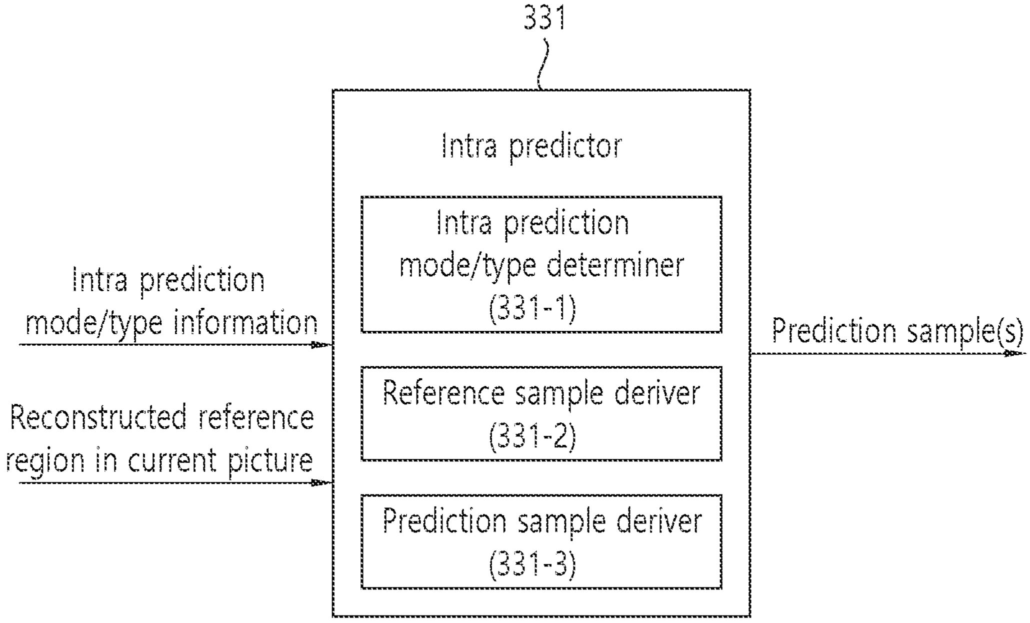
FIG. 8 schematically illustrates an intra predictor in a decoding apparatus.

FIG. 7 schematically illustrates an example of an image decoding method based on intra prediction to which embodiments of the present disclosure may be applied, and FIG. 8 schematically illustrates an intra predictor in a decoding apparatus. The intra predictor in the decoding apparatus of FIG. 8 may be applied to the same or corresponding to the above-described intra predictor 331 of the decoding apparatus 300 of FIG. 2.

Referring to FIGS. 7 and 8, the decoding apparatus may perform an operation corresponding to the operation performed by the above-described encoding apparatus. S700 to S720 may be performed by the intra predictor 331 of the decoding apparatus, and the prediction information of S700 and the residual information of S730 may be obtained from the bitstream by the entropy decoder 310 of the decoding apparatus. The residual processor 320 of the decoding apparatus may derive residual samples for the current block based on the residual information. Specifically, the dequantizer 321 of the residual processor 320 derives transform coefficients by performing dequantization based on the quantized transform coefficients derived based on the residual information, and the inverse transformer of the residual processor 322 may derive residual samples for the current block by performing an inverse transform on the transform coefficients. S740 may be performed by the adder 340 or a reconstructor of the decoding apparatus.

The decoding apparatus may derive an intra prediction mode/type for the current block based on the received prediction information (intra prediction mode/type information) (S700). The decoding apparatus may derive neighboring reference samples of the current block (S710). The decoding apparatus generates prediction samples within the current block based on the intra prediction mode/type and neighboring reference samples (S720). In this case, the decoding apparatus may perform a prediction sample filtering process. Prediction sample filtering may be referred to as post filtering. Some or all of the prediction samples may be filtered through the prediction sample filtering process. In some cases, the prediction sample filtering process may be omitted.

The decoding apparatus generates residual samples for the current block based on the received residual information (S730). The decoding apparatus may generate reconstructed samples for the current block based on the prediction samples and residual samples, and derive a reconstructed block including the reconstructed samples (S740). A reconstructed picture for a current picture may be generated based on the reconstructed block. As described above, an in-loop filtering process or the like may be further applied to the reconstructed picture.

Here, the intra predictor 331 of the decoding apparatus may include an intra prediction mode/type determiner 231-1, a reference sample deriver 331-2, and a prediction sample deriver 231-3. The intra prediction mode/type determiner 331-1 determines the intra prediction mode/type of the current block based on the intra prediction mode/type information obtained from the entropy decoder 310, and the reference sample deriver 331-2) may derive neighboring reference samples of the current block, and the prediction sample deriver 331-3 may derive prediction samples of the current block. Meanwhile, although not shown, when the above-described prediction sample filtering process is performed, the intra prediction unit 331 may further include a prediction sample filter (not shown.

The intra prediction mode information may, for example, include flag information (e.g., intra_luma_mpm_flag) indicating whether a most probable mode (MPM) is applied to the current block or whether a remaining mode is applied to the current block. At this point, when MPM is applied to the current block, the prediction mode information may further include index information (e.g., intra_luma_mpm_idx) indicating one of the intra prediction mode candidates (MPM candidates). The intra prediction mode candidates (MPM candidates) may be configured as an MPM candidate list or an MPM list. Additionally, when the MPM is not applied to the current block, the intra prediction mode information may further include remaining mode information (e.g., intra_luma_mpm_remainder) indicating one of the remaining intra prediction modes excluding the intra prediction mode candidates (MPM candidates). The decoding apparatus may determine the intra prediction mode of the current block based on the intra prediction mode information. At this point, a separate MPM list may be configured for the above-described MIP.

In addition, intra prediction type information may be implemented in various forms. For example, intra prediction type information may include intra prediction type index information indicating one of intra prediction types. As another example, the intra prediction type information includes at least one of reference sample line information (ex. intra_luma_ref_idx) indicating whether the MRL is applied to the current block and, if the MRL is applicable, whether a reference sample line is used or not, ISP flag information (ex. intra_subpartitions_mode_flag) indicating whether the ISP is applied to the current block, ISP type information (ex. intra_subpartitions_split_flag) in which subpartitions indicates a partition type when the ISP is applied, flag information indicating whether PDCP is applied, or flag information whether LIP is applied. In addition, the intra prediction type information may include a MIP flag information indicating whether MIP is applied to the current block.

The aforementioned intra prediction mode information and/or intra prediction type information may be encoded/decoded through the coding method described in this document. For example, the aforementioned intra prediction mode information and/or intra prediction type information may be encoded/decoded through entropy coding (eg. CABAC, CAVLC) coding based on truncated (rice) binary code.

Figure 9:
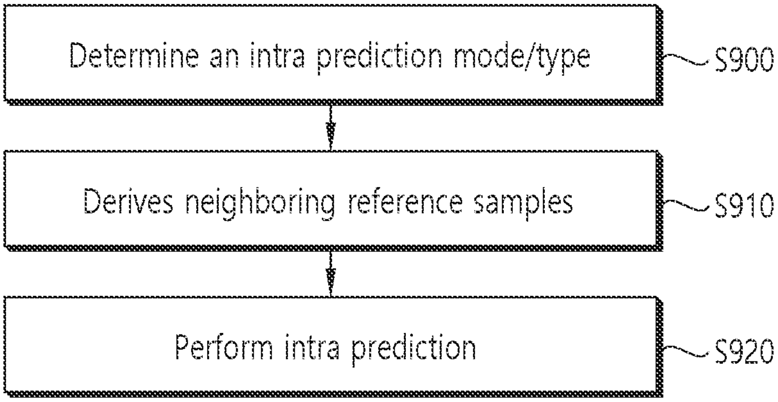
FIG. 9 exemplarily illustrates a schematic intra prediction process to which embodiments of the present disclosure may be applied.

FIG. 9 exemplarily illustrates a schematic intra prediction process to which embodiments of the present disclosure may be applied.

Referring to FIG. 9, as described above, the intra prediction process may include determining an intra prediction mode/type, deriving neighboring reference samples, and performing intra prediction (generating prediction samples). The intra prediction process may be performed in the encoding apparatus and the decoding apparatus as described above. A coding apparatus in this document may include an encoding apparatus and/or a decoding apparatus.

The coding apparatus may determine an intra prediction mode/type (S900).

Among the above-described various intra prediction modes/types, the coding apparatus may determine an intra prediction mode/type that is applied to the current block and then generate prediction related information. The prediction related information may include intra prediction mode information indicating the intra prediction mode that is applied to the current block and/or intra prediction type information indicating the intra prediction type that is applied to the current block. The decoding apparatus may determine the intra prediction mode/type that is applied to the current block based on the prediction related information.

As described above, the intra prediction mode information may include at least one of MPM flag information, non-planar flag information, MPM index information, and/or remaining mode (MPM reminder) information. As described above, the intra prediction type information includes reference sample line (MRL index) information (ex. intra_luma_ref_idx), ISP flag information (ex. intra_subpartitions_mode_flag). ISP type information (ex. intra_subpartitions_split_flag), and flag information indicating whether PDCP is applied or not. flag information indicating whether LIP is applied and/or MIP flag information.

For example, when intra prediction is applied, the intra prediction mode applied to the current block may be determined using the intra prediction modes of neighboring blocks. For example, the coding apparatus may select one of MPM candidates in a most probable mode (MPM) list derived based on an intra prediction mode and/or additional candidate modes of a neighboring block (eg, a left and/or upper neighboring block) of a current block, based on the received MPM index, or may select one of the remaining intra prediction modes not included in the MPM candidates (and planar mode) based on MPM reminder information (remaining intra prediction mode information). The MPM list may be configured to include or not include a planar mode as a candidate. For example, if the mpm list includes the planar mode as a candidate, the MPM list may have 6 candidates, and if the MPM list does not include the planar mode as a candidate, the mpm list may have 5 candidates. When the MPM list does not include a planar mode as a candidate, a non-planar flag (ex. intra_luma_not_planar_flag) indicating whether the intra prediction mode of the current block is not a planar mode may be signaled. For example, the MPM flag may be signaled first, and the MPM index and non-planar flag may be signaled when the value of the MPM flag is 1. Also, the MPM index may be signaled when the value of the non-planar flag is 1. Here, the reason why the MPM list is configured not to include the planar mode as a candidate is that the planar mode is not MPM, rather than that the planar mode is always considered as the MPM, so a not planar flag is first signaled. This is to check whether it is in planar mode first.

For example, whether the intra prediction mode applied to the current block is among MPM candidates (and planar mode) or remaining mode may be indicated based on an MPM flag (ex. intra_luma_mpm_flag). A value of 1 of the MPM flag may indicate that the intra prediction mode for the current block is within MPM candidates (and planar mode), and a value of 0 of the MPM flag may indicate that the intra prediction mode for the current block is not within MPM candidates (and planar mode). The not planar flag (ex. intra_luma_not_planar_flag) value 0 may indicate that the intra prediction mode of the current block is the planar mode, and the not planar flag value 1 may indicate that the intra prediction mode of the current block is not the planar mode. The MPM index may be signaled in the form of an mpm_idx or intra_luma_mpm_idx element, and the remaining intra prediction mode information may be signaled in the form of a rem_intra_luma_pred_mode or intra_luma_mpm_remainder syntax element. For example, the remaining intra prediction mode information may indicate one of all intra prediction modes by indexing remaining intra prediction modes not included in the MPM candidates (and planar mode) in order of prediction mode numbers. The intra prediction mode may be an intra prediction mode for a luma component (sample). Hereinafter, the intra prediction mode information includes at least one of the MPM flag (ex. intra_luma_mpm_flag), the not planar flag (ex. intra_luma_not_planar_flag), the MPM index (ex. mpm_idx or intra_luma_mpm_idx), and the remaining intra prediction mode information (rem_intra_luma_pred_mode or intra_luma_mpm_remainder). In this document, the MPM list may be called various terms such as MPM candidate list and candModeList.

When MIP is applied to the current block, a separate mpm flag (ex. intra_mip_mpm_flag), mpm index (ex. intra_mip_mpm_idx), and remaining intra prediction mode information (ex. intra_mip_mpm_remainder) for MIP may be signaled, and the not planar flag may not be signaled.

In other words, when an image is generally partitioned into blocks, the current block to be coded and neighboring blocks have similar image characteristics. Therefore, the current block and neighboring blocks are highly likely to have the same or similar intra prediction modes. Thus, the encoder can use the intra-prediction mode of the neighboring block to encode the intra-prediction mode of the current block.

A most probable modes (MPM) list for a current block of a coding apparatus may be configured. The MPM list may also be referred to as an MPM candidate list. Here, the MPM may mean a mode used to improve coding efficiency by considering the similarity between the current block and neighboring blocks during intra prediction mode coding. As described above, the MPM list may include the planar mode or may exclude the planar mode. For example, when the MPM list includes a planar mode, the number of candidates in the MPM list may be 6. And, when the MPM list does not include the planar mode, the number of candidates in the MPM list may be five.

The encoding apparatus may perform prediction based on various intra prediction modes, and may determine an optimal intra prediction mode based on rate-distortion optimization (RDO) based thereon. In this case, the encoding apparatus may determine the optimal intra prediction mode using only the MPM candidates and planar mode configured in the MPM list, or may further use the remaining intra-prediction modes as well as MPM candidates and planar modes configured in the MPM list. Specifically, if the intra prediction type of the current block is a specific type (eg. LIP. MRL, or ISP) rather than a normal intra prediction type, the encoding apparatus considers only the MPM candidates and planar mode as the intra prediction mode candidates for the current block, and then determines the optimal intra prediction mode. That is, in this case, the intra prediction mode for the current block may be determined only from among the MPM candidates and the planar mode, and in this case, the mpm flag may not be encoded/signaled. In this case, the decoding apparatus may estimate that the mpm flag is 1 without separately signaling the mpm flag.

Meanwhile, in general, when the intra prediction mode of the current block is not a planar mode and is one of MPM candidates in the MPM list, the encoding apparatus generates an mpm index (mpm idx) indicating one of the MPM candidates. If the intra prediction mode of the current block is not included in the MPM list. MPM remainder information (remaining intra prediction mode information) indicating the same mode as the intra prediction mode of the current block among the remaining intra prediction modes not included in the MPM list (and planar mode) is generating. The MPM reminder information may include, for example, an intra_luma_mpm_remainder syntax element.

The decoding apparatus obtains intra prediction mode information from the bitstream. As described above, the intra prediction mode information may include at least one of an MPM flag, a non-planar flag, an MPM index, or MPM reminder information (remaining intra prediction mode information). The decoding apparatus may construct an MPM list. The MPM list is configured identically to the MPM list configured in the encoding apparatus. That is, the MPM list may include intra prediction modes of neighboring blocks or may further include specific intra prediction modes according to a predetermined method.

The decoding apparatus may determine the intra prediction mode of the current block based on the MPM list and the intra prediction mode information. For example, when the value of the MPM flag is 1, the decoding apparatus derives a planar mode as an intra prediction mode of the current block (based on a not planar flag) or selects a candidate indicated by the MPM index from among MPM candidates in the MPM list. It can be derived as an intra prediction mode of the current block. Here, the MPM candidates may indicate only candidates included in the MPM list, or may include not only candidates included in the MPM list but also a planar mode that may be applied when the value of the MPM flag is 1.

As another example, when the value of the MPM flag is 0, the decoding apparatus may derive an intra prediction mode indicated by the remaining intra prediction mode information (which may be called mpm remainder information) among the remaining intra prediction modes not included in the MPM list and the planar mode as an intra prediction mode of the current block. Meanwhile, as another example, when the intra prediction type of the current block is a specific type (eg. LIP, MRL, or ISP), the decoding apparatus may derive the candidate indicated by the MPM flag in the planar mode or the MPM list as the intra prediction mode of the current block without parsing/decoding/confirming the MPM flag.

The coding device derives neighboring reference samples of the current block (S910). When intra prediction is applied to the current block, neighboring reference samples to be used for intra prediction of the current block may be derived. The neighboring reference samples of the current block include a total of 2×nH samples adjacent to the left boundary of the current block of size nW×nH and samples neighboring to the bottom-left of the current block of size nW×nH, and a total 2×nW samples adjacent to the top boundary of the current block and samples neighboring to the top-right of the current block of size nW×nH and | sample neighboring to the top-left of the current block. Alternatively, the neighboring reference samples of the current block may include samples top neighboring samples in a plurality of columns and left neighboring samples in a plurality of rows. In addition, the neighboring reference samples of the current block may include a total of nH samples adjacent to the right boundary of the current block of size nW×nH, a total of nW samples adjacent to the bottom boundary of the current block of size nW×nH, and 1 sample neighboring to the bottom-right of the current block of size nW×nH.

Meanwhile, when MRL is applied (ie, when the value of the MRL index is greater than 0), the neighboring reference samples may be located on lines 1 to 2 instead of line 0 adjacent to the current block on the left/upper side. In this case, the number of neighboring reference samples may be further increased. Meanwhile, when ISP is applied, the neighboring reference samples may be derived in units of sub-partitions.

The coding apparatus derives prediction samples by performing intra prediction on the current block (S920). The coding apparatus may derive the prediction samples based on the intra prediction mode/type and the neighboring samples. The coding apparatus may derive a reference sample according to an intra prediction mode of the current block among neighboring reference samples of the current block, and may derive a prediction sample of the current block based on the reference sample.

Meanwhile, when intra prediction is applied, an intra prediction mode applied to the current block may be determined using intra prediction modes of neighboring blocks. For example, the decoding apparatus may select one of mpm candidates in a most probable mode (mpm) list list derived based on an intra prediction mode of a neighboring block (eg, a left and/or an upper neighboring block) of a current block and additional candidate modes, based on received mpm index, or may select one of the remaining intra prediction modes not included in the mpm candidates (and planar mode) based on the remaining intra prediction mode information. The mpm list can be configured to include or not include planar modes as candidates. For example, if the mpm list includes the planar mode as a candidate, the mpm list may have 6 candidates, and if the mpm list does not include the planar mode as a candidate, the mpm list may have 5 candidates. If the mpm list does not include a planar mode as a candidate, a non-planar flag (ex. intra_luma_not_planar_flag) indicating whether the intra prediction mode of the current block is not a planar mode may be signaled. For example, the mpm flag may be signaled first, and the mpm index and non-planar flag may be signaled when the value of the mpm flag is 1. Also, the mpm index may be signaled when the value of the non-planar flag is 1. Here, the fact that the mpm list is configured not to include the planar mode as a candidate is not that the planar mode is not mpm, but rather that the planar mode is always considered as mpm, so a not planar flag is first signaled to determine whether the planar mode is the planar mode, to check first.

For example, whether the intra prediction mode applied to the current block is among mpm candidates (and planar mode) or remaining mode may be indicated based on an mpm flag (ex. intra_luma_mpm_flag). A value of mpm flag 1 may indicate that the intra prediction mode for the current block is within mpm candidates (and planar mode), and a value of mpm flag 0 may indicate that the intra prediction mode for the current block is not within mpm candidates (and planar mode). A value of not planar flag (ex. intra_luma_not_planar_flag) 0) may indicate that the intra prediction mode of the current block is the planar mode, and a value of not planar flag 1 may indicate that the intra prediction mode of the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of all intra prediction modes by indexing remaining intra prediction modes not included in mpm candidates (and planar mode) in order of prediction mode number. The intra prediction mode may be an intra prediction mode for a luma component (sample). Hereinafter, intra prediction mode information may include at least one of mpm flag (ex. intra_luma_mpm_flag), not planar flag (ex. intra_luma_not_planar_flag), mpm index (ex. mpm_idx or intra_luma_mpm_idx), or remaining intra prediction mode information (rem_intra_luma_pred_mode or intra_luma_mpm_remainder). In this document, the mpm list may be called various terms such as an mpm candidate list, a candidate mode list (candModeList), and a candidate intra prediction mode list.

Meanwhile, the coding apparatus may configure an MPM list including 6 MPM list candidates. At this point, 3 types of modes may be considered.

Default intra modes

Neighbouring intra modes

Derived intra modes

At this point, two neighbouring (or neighboring) blocks, for example, a left-side neighboring block and an upper-side neighboring block may be considered for the neighboring intra modes.

For example, regardless of whether or not Multi Reference Line (MRL) and Intra Sub-Partitions (ISP) coding tools are being applied, a unified 6-MPM list may be used for the intra blocks. Additionally, the MPM list may be configured based on a left-side neighboring block and an upper-side neighboring block. For example, when a mode of the left-side block is given as Left and a mode of the upper-side block is given as Above, the unified MPM list may be configured as follows. In other words, when an intra prediction mode of a left-side block is given as Left and an intra prediction mode of an upper-side block is given as Above, the unified MPM list may be configured as follows. Herein, V may mean a vertical intra prediction mode, and H may mean a horizontal intra prediction mode.

When a neighboring block is not available, the corresponding intra mode is basically configured as a planar mode.

When Left and Above are both non-directional modes:

the MPM list may be configured as {Planar, DC, V, H, V−4, V+4}.

When one of Left and Above is a directional mode and the other is a non-directional mode:

between Left and Above, the mode having the higher (or larger) mode number is configured as Mode Max.

at this point, the MPM list may be configured as {Planar, Max, Max−1, Max+1, Max−2, Max+2}.

When Left and Above are both directional modes and each mode corresponds to a different directional mode:

between Left and Above, the mode having the higher (or larger) mode number is configured as Mode Max.

between Left and Above, the mode having the lower (or smaller) mode number is configured as Mode Min.

When a Max−Min value is equal to 1:

the MPM list may be configured as {Planar, Left, Above, Min−1, Max+1, Min−2}.

Otherwise, when the Max−Min value is greater than or equal to 62:

the MPM list may be configured as {Planar, Left, Above, Min+1, Max−1, Min+2}.

Otherwise, when the Max−Min value is equal to 2:

the MPM list may be configured as {Planar, Left, Above, Min+1, Min−1, Max+1}.

Otherwise:

the MPM list may be configured as {Planar, Left, Above, Min−1, Min+1, Max−1}.

When Left and Above are both directional modes and each mode corresponds to the same directional mode:

the MPM list may be configured as {Planar, Left, Left−1, Left+1, Left−2, Left+2}.

Additionally, a first bin of an MPM index codeword may be CABAC context-coded. A total of 3 contexts may be used depending upon whether the MPM index codeword is MRL enabled, whether the MPM index codeword is ISP enabled, or whether the MPM index codeword is a generic intra block.

At this point, the above-described MPM list configuration method may be used when MIP is not applied to the current block. For example, the above-described MPM list configuration method may be used for intra prediction mode derivation, which is used in LIP, PDPC. MRL, ISP intra prediction or normal intra prediction. Meanwhile, the left-side neighboring block or the upper-side neighboring block may be coded based on the above-described MIP. That is, when coding the left-side neighboring block or the upper-side neighboring block, MIP may be applied. In this case, it is not appropriate to use the same MIP intra prediction mode number of the neighboring block (left-side neighboring block/upper-side neighboring block) having MIP applied thereto to the MPM list for the current block where MIP is not applied. Therefore, in this case, for example, the intra prediction mode of the neighboring block (left-side neighboring block/upper-side neighboring block) having MIP applied thereto may be regarded as DC or planar mode. Alternatively, as another example, the intra prediction mode of the neighboring block (left-side neighboring block/upper-side neighboring block) having MIP applied thereto may be mapped to a generic intra prediction mode based on a mapping table and then used in an MPM list configuration. In this case, the mapping may be performed based on the block size type of the current block. For example, the mapping table may be represented as described below.

Figure 10:
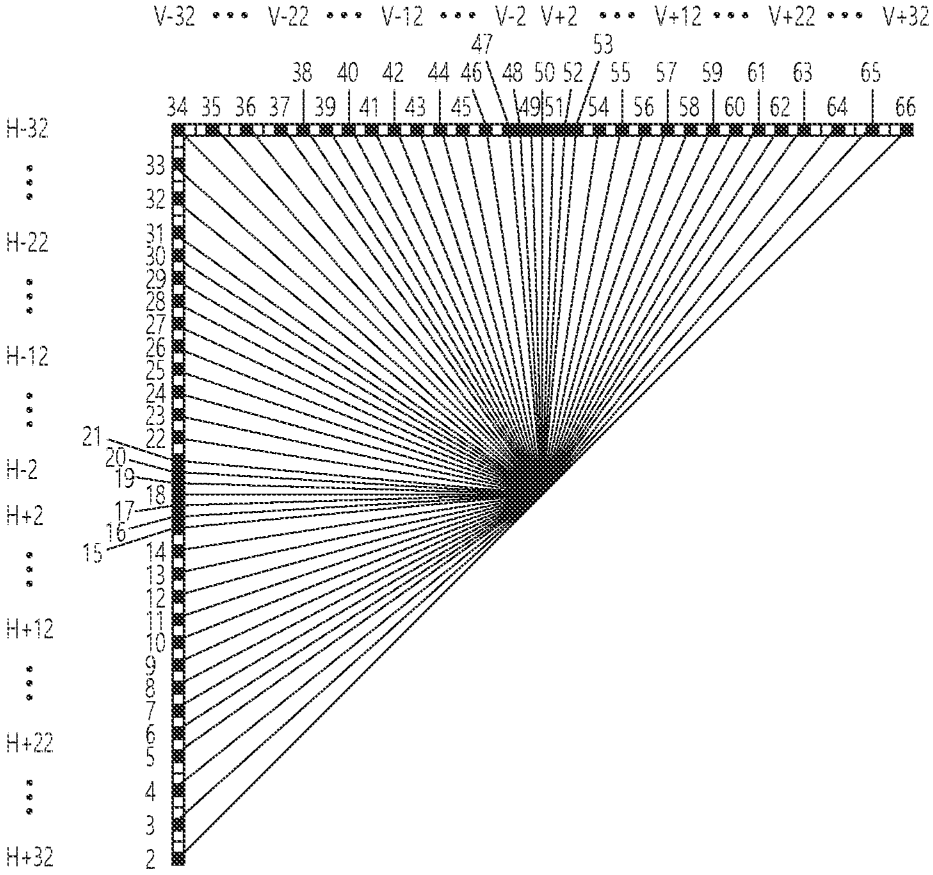
FIG. 10 illustrates an example of intra prediction modes to which embodiments of the present disclosure may be applied.

FIG. 10 illustrates an example of intra prediction modes to which embodiments of the present disclosure may be applied.

Referring to FIG. 10, an intra prediction mode with horizontal direction and an intra prediction mode with vertical direction can be distinguished around intra prediction mode no. 34 with a upward-left diagonal prediction direction. H and V of FIG. 8 refer to horizontal and vertical directions, respectively, and numbers −32 to 32 represent displacements of 1/32 units on a sample grid position. Intra prediction modes 2 to 33 have horizontal directionality, and intra prediction modes 34 to 66 have vertical directionality. The 18th and 50th intra prediction modes represent horizontal intra prediction modes and vertical intra prediction modes, respectively, while the 2nd intra prediction mode is called the downward-left diagonal intra prediction mode, and the 34th intra prediction mode may be referred to as an upper-left diagonal intra prediction mode, and the 66th intra prediction mode may be referred to as an upper-left diagonal intra prediction mode.

Hereinafter, as a method of intra prediction, a Template-based Intra Mode Derivation (TIMD) mode will be described.

For example, the TIMD mode may also be referred to as a Template-based Intra Mode Derivation mode, a Template Intra Mode Derivation mode, and so on.

Additionally, for example, the TIMD mode may be referred to as a TIMD intra mode. Also, the TIMD mode may be referred to as a TIMD intra prediction mode or a TIMD prediction mode.

Also, for example, intra mode may be referred to as intra prediction mode in this document. In addition, intra mode and intra prediction mode may be used interchangeably.

Figure 11:
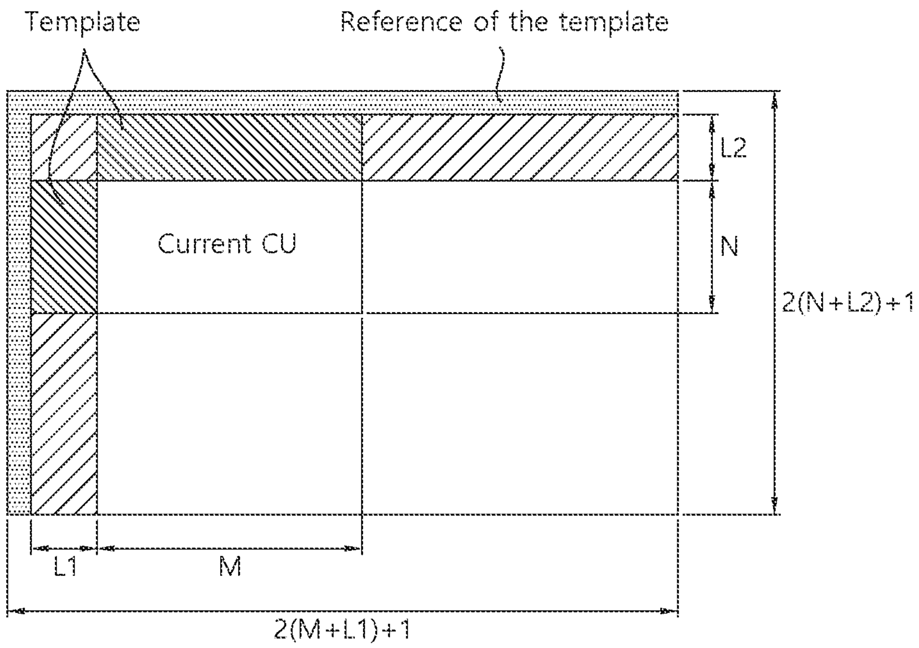
FIG. 11 exemplarily illustrates a template that is used for deriving an intra prediction mode for a TIMD mode.

FIG. 11 exemplarily illustrates a template that is used for deriving an intra prediction mode for a TIMD mode.

When the TIMD mode is used, a decoder may derive an intra mode of a current CU by using previously decoded neighboring pixels. For example, prediction samples for a neighboring template may be derived based on neighboring reference samples of a neighboring template of a current block (or current CU), the derived prediction samples for the neighboring template may be compared with reconstructed samples of the neighboring template, and, then, the intra mode of the current block (or current CU) may be derived accordingly. More specifically, after deriving a Sum of Absolute Transformed Difference (SATD) between prediction samples that are derived based on neighboring reference samples of a neighboring template and reconstructed samples of the neighboring template, a mode having the smallest SATD may be selected as the intra mode of the current block.

For example, prediction samples of the template may be derived based on the neighboring reference samples, i.e., reference of the template, located outside of the template. After deriving the SATD between the derived prediction samples of the template and the reconstructed samples of the template that has already been derived during the reconstruction process, the mode having the smallest SATD may be selected as the intra mode of the current block. Since the template is an area having its reconstruction already completed based on the decoding order, the above-described method may be used.

Additionally, for example, for each MPM candidate in the MPM list, after obtaining the SATD between the derived prediction samples of the template and the reconstructed samples of the template that has already been derived during the reconstruction process, the mode having the smallest SATD may be selected as the intra mode of the current block.

Alternatively, after selecting 2 prediction modes having the smallest SATDs, the prediction blocks for the 2 prediction modes may be blended by using a weighted sum method, which may then be used as the prediction block of the current block. In other words, a prediction mode having the smallest SATD and a prediction mode having the next smallest SATD may be blended by using the weighted sum method, which may then be used as the prediction block of the current block.

Meanwhile, the 2 modes having the smallest SATD costs may be used for being blended with a weighted value (or weight) that is to be used as a weighted intra prediction for the current block. The method for blending the 2 selected modes may be applied when satisfying the equation shown below.

$$costMode2 < 2 * costMode1 \quad \text{[Equation 1]}$$

For example, when Equation 1 is true, the 2 modes may be blended to generate a prediction block. And, otherwise, only one mode having the smallest SATD may be selected.

Additionally, the weighted value when blending the two prediction blocks may be calculated by using the equation shown below.

$$\text{weight1} = costMode2/(costMode1 + costMode2) \quad \text{[Equation 2]}$$

$$\text{weight2} = 1 - \text{weight1}$$

Herein, costMode 1 may be an SATD cost of Mode 1, and costMode 2 may be an SATD cost of Mode 2.

Hereinafter, a Decoder Side Intra Mode Derivation (DIMD) mode, which is a method of intra prediction, will be described.

For example, DIMD modes include Decoder Side Intra Mode Derivation mode. Decoder Intra Mode Derivation mode, Decoder Side Intra Prediction Mode, and Decoder Intra Mode Prediction mode. (Decoder Intra Prediction Mode).

Also, for example, the DIMD mode may be referred to as a DIMD intra mode. Also, the DIMD mode may be referred to as a DIMD intra prediction mode or a DIMD prediction mode.

For example, the DIMD mode may be used by deriving the intra prediction mode from the encoder and decoder without directly transmitting the intra prediction mode information. For example, a horizontal gradient and a vertical gradient may be obtained from a second neighboring column and row, and a histogram of gradients (HoG) may be obtained from the obtained horizontal and vertical gradients.

Figure 12:
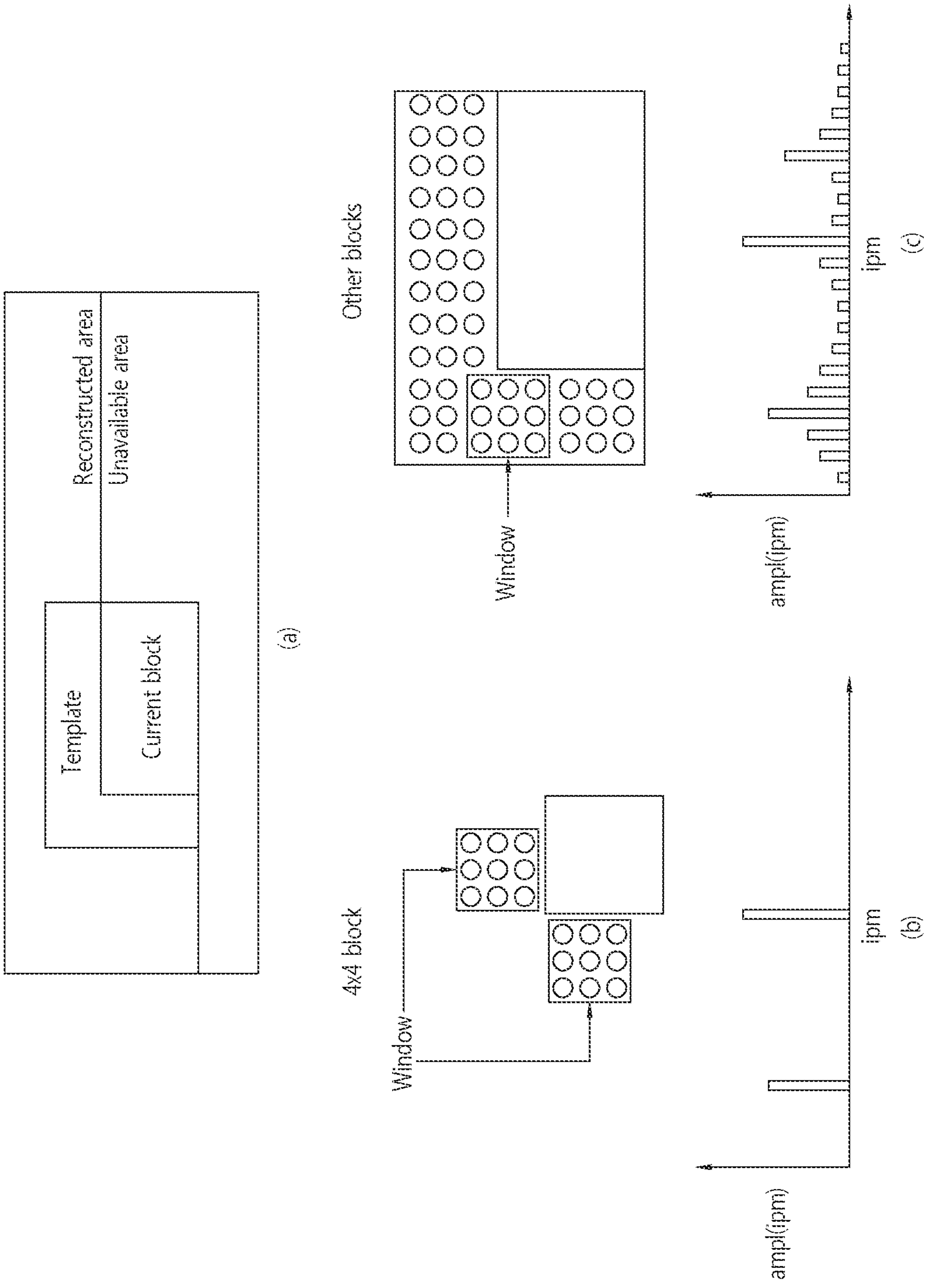
FIG. 12 exemplarily illustrates a Histogram of Gradients (HoG) configuration method that is used to derive intra prediction modes for a DIMD mode.

FIG. 12 exemplarily illustrates a Histogram of Gradients (HoG) configuration method that is used to derive intra prediction modes for a DIMD mode.

For example, (a) of FIG. 12 exemplarily illustrates a template that is used for deriving an intra prediction mode for the DIMD mode. Additionally. (b) of FIG. 12 and (c) of FIG. 12 illustrate a configuration method of the HoG that is used for deriving an intra prediction mode for the DIMD mode.

For example, according to (b) of FIG. 12, the HoG may be obtained by applying a sobel filter by using L-shaped column and row of neighboring 3 pixels of the current block. For example, when the boundaries of a block exist in different CTUs, neighboring pixels of the current block may not be used for texture analysis.

Meanwhile, the Sobel filter may also be called a Sobel operator, and is an efficient filter for edge detection. When using a Sobel filter, there are two types of Sobel filters available: a Sobel filter for vertical direction and a Sobel filter for horizontal direction.

Figure 13:
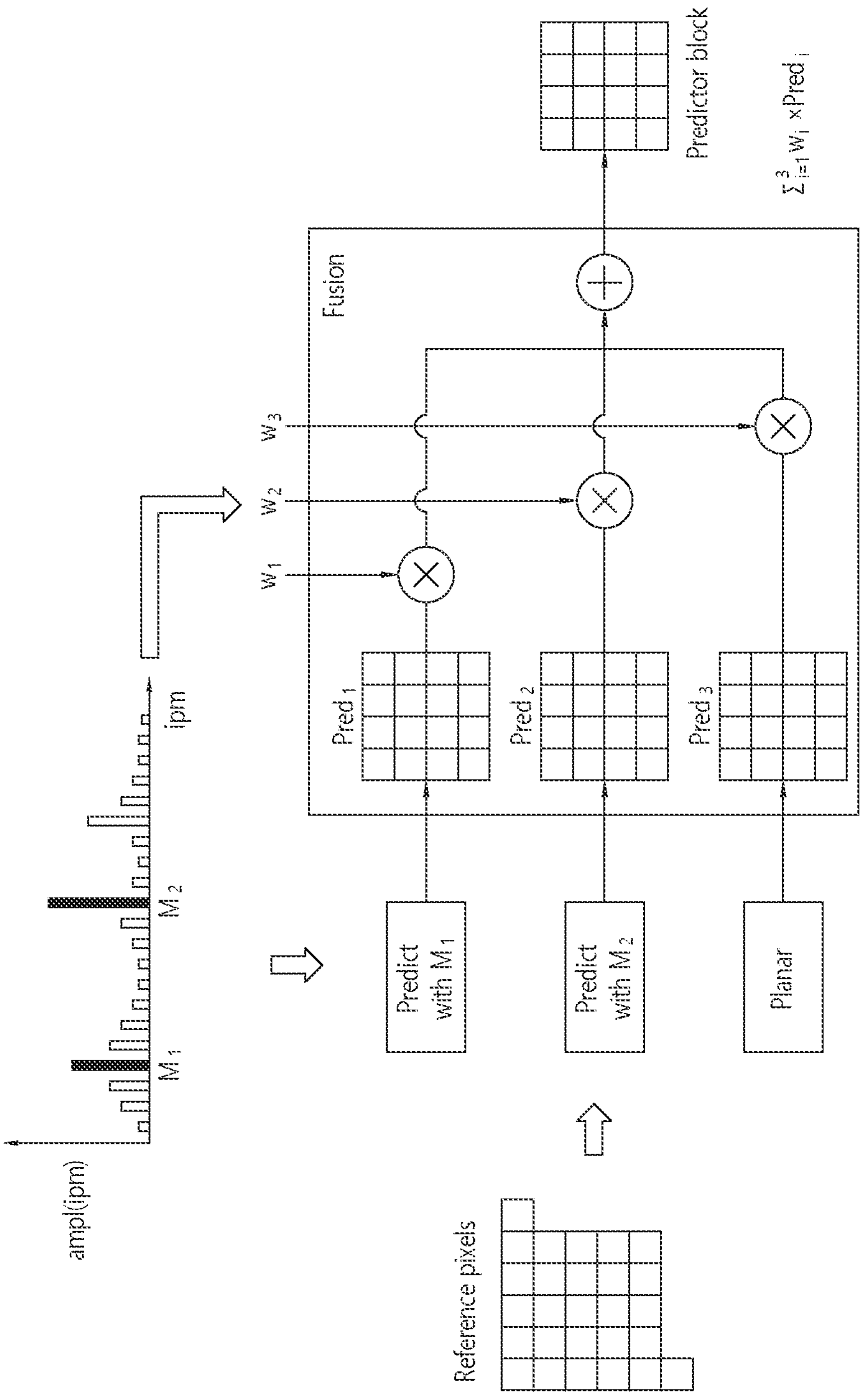
FIG. 13 exemplarily illustrates a method for configuring a prediction block by applying the DIMD mode.

FIG. 13 exemplarily illustrates a method for configuring a prediction block by applying the DIMD mode.

For example, according to FIG. 13, 2 intra modes having the highest histogram amplitudes may be selected, and prediction blocks that are predicted by using the 2 modes and a planar mode are blended so as to configure a final prediction block. In other words, an intra mode having the highest histogram amplitude and an intra mode having the second highest histogram amplitude may be selected, and prediction blocks that are predicted by using the 2 selected modes and a planar mode are blended so as to configure a final prediction block. At this point, a weighted value for the modes may be derived from an amplitude of the histogram. Additionally, for example, DIMD flag information may be transmitted in block units, thereby enabling usage or non-usage of the DIMD to be verified. At this point, the DIMD flag information may indicate whether or not the DIMD mode is being applied.

For example, a weighted value for an intra mode having the highest histogram amplitude may be calculated by using the equation shown below.

$$w_1 = \frac{43}{64} \times \frac{ampl(M_1)}{ampl(M_1) + ampl(M_2)} \quad \text{[Equation 3]}$$

Additionally, a weighted value for an intra mode having a second highest histogram amplitude may be calculated by using the equation shown below.

$$w_2 = \frac{43}{64} \times \frac{ampl(M_2)}{ampl(M_1) + ampl(M_2)} \quad \text{[Equation 4]}$$

Furthermore, a weighted value for a planar mode may be calculated by using the equation shown below.

$$w_3 = \frac{21}{64} \quad \text{[Equation 5]}$$

Meanwhile, in order to perform an efficient intra mode coding method, the following embodiments may be applied. The items of each embodiment may be applied independently or in combination.

According to an embodiment, proposed herein is a method for preventing an intra mode of a current block that is derived by DIMD from being selected multiple times according to the coding mode. For example, DIMD may infer a directionality of a pixel by using information of an already-coded neighboring pixel of the current block and may use the inferred directionality as the intra mode of the current block. At this point, various directionalities may be derived according to gradients between the neighboring pixels, and each gradient distribution may be sorted by a histogram of gradients (HoG) for the intra mode, and N number of direction information that are determined to be most similar through the HoG may be mapped to the intra mode and then used.

For example, if all pixel values of the neighboring pixel are the same, it may be impossible to derive a gradient. And, accordingly, the prediction mode of the current block may be selected as a non-directional mode.

Alternatively, for example, when a neighboring pixel relation clearly indicates only one specific directionality, one direction information may be derived. For example, after deriving a prediction mode, when 2 intra prediction modes are derived during the process of configuring a DIMD prediction block (i.e., N=2), a weighted value is calculated by using amplitudes of a gradient indicating two prediction modes. Thereafter, by adding a weighted value of a fixed planar mode, an intra prediction block may be configured by a weighted sum of 3 mode types.

Meanwhile, when only one mode is derived (i.e., N=1), a weighted sum with the planar prediction block is not calculated. In other words, when only 1 DIMD mode is derived, a weighted sum with the planar mode may not be calculated.

Additionally, when a neighboring pixel cannot be used, or when the directionality of a neighboring block cannot be specified (i.e., N=0 or a non-directional block), a default mode may be configured. At this point, the default mode may be a planar mode.

For example, when the current block is coded by using the DIMD mode (i.e., a block having the DIMD flag equal to 1), the above-described intra mode may be derived, and, depending upon the condition(s), a weighted sum between the prediction blocks is calculated so as to generate an intra prediction block. Alternatively, when the current block is not coded by using the DIMD mode, the intra mode that is derived by the DIMD process may be used as a prediction mode candidate of the current block. That is, the derived intra mode may be used as an MPM candidate, or, when the current block is a TIMD mode, the derived intra mode may be used as part of the prediction mode candidate of the current block. In other words, when the current block is not coded by using the DIMD mode, the intra mode that is derived by the DIMD process may be used as an MPM candidate of the current block, or may be used as part of the prediction mode candidate of the current block, when deriving the TIMD mode.

Meanwhile, when the current block is not selected as the DIMD mode and is coded by using a generic intra mode, a neighboring pixel may be located at coordinates (boundaries of a picture, slice, and so on) of the block that cannot be used, or, when a prediction direction cannot be specified from a neighboring pixel, a planar mode being the default mode may be selected. For example, according to the MPM configuration method, the planar mode may always be considered as a first candidate of MPM candidates. In this case, a planar mode that is derived by the DIMD is always excluded from the MPM candidates. In other words, through a pruning process, the planar mode may always be excluded from the MPM candidates. Therefore, the present embodiment proposes designate a default mode of the DIMD as another mode other than the planar mode.

For example, the default mode of the DIMD may be a DC mode. In case of the DC mode, since the DC mode does not always belong to the MPM candidates, the DC mode is unlikely to be selected by multiple selection, and, when direction information cannot be inferred from a neighboring pixel, the DC mode may be appropriate for being considered as the non-directional mode. Additionally, when the prediction mode of the DIMD is a planar direction, even if the current block is not selected as the DIMD mode, there may occur a case where the MPM may select the planar mode. However, by using the proposed method, the inefficient multiple selection of the coding mode may be prevented.

Alternatively, for example, a default mode of DIMD may be a horizontal prediction mode or a vertical prediction mode. At this point, by designating a prediction mode that is statistically most frequently shown in the intra mode information as the default mode, a more efficient mode coding may be possible. Alternatively, the default mode of DIMD may be one of the directional prediction modes.

Meanwhile, when only one directional mode is derived due to a gradient distribution of a neighboring pixel of the current block, the weighted sum of the corresponding prediction mode and another prediction mode (e.g., planar mode, and so on) may not be calculated. Additionally, when the current block is not coded by using the DIMD mode, when configuring the MPM, the DIMD prediction mode may be considered as some of the MPM candidates. At this point, when the DIMD prediction mode is inputted in the MPM and selected as the final prediction mode, this may have the same effect as selecting a same prediction mode and performing coding by varying only the mode (either the DIMD mode or the MPM mode). Therefore, when performing intra prediction in order to prevent inefficient multiple selection of the coding mode from occurring, the following embodiments may be applied.

According to an embodiment, proposed herein is a method of calculating a weighted sum with a planar mode, even when the DIMD prediction mode is derived as one directional prediction mode.

For example, the weighted sum may be calculated by using ⅔ for the DIMD prediction mode and ⅓ for the planar mode. Alternatively, when the sum of the weighted values is scaled to 64, the DIMD prediction mode may have a weighted value of 43, and the planar mode may have a weighted value of 21. By performing the above-described method, a prediction block of the DIMD mode and a prediction block predicted as the DIMD prediction mode in the MPM, when the mode is not DIMD, may be different from one another. Accordingly, the inefficient multiple selection of the coding mode may be prevented. In other words, when the DIMD prediction mode is derived as one directional prediction mode, the weighted sum of the DIMD prediction mode and the planar mode may be calculated. Accordingly, a prediction block of the DIMD mode and a prediction block predicted as the DIMD prediction mode in the MPM, when the mode is not DIMD, may be different from one another. Thus, by preventing the prediction blocks from being the same, an efficient intra prediction may be performed.

Additionally, according to an embodiment, when the DIMD prediction mode is derived as one directional prediction mode, and when the current block is not a DIMD mode, proposed herein is a method of not inputting the DIMD prediction mode as a candidate mode during the process of configuring the candidates, such as MPM, TIMD, and so on. That is, when the DIMD prediction mode is derived as one directional prediction mode, and when the current block is not coded by using the DIMD mode, proposed herein is a method of not inputting the DIMD prediction mode as a candidate mode during the process of configuring the candidates, such as MPM. TIMD, and so on.

For example, when the DIMD prediction mode is derived as one directional prediction mode, and when the current block is not a DIMD mode, the one directional prediction mode may not be considered during the process of configuring MPM candidates. Additionally, when the DIMD prediction mode is derived as one directional prediction mode, and when the current block is not a DIMD mode, the one directional prediction mode may not be considered during the process of deriving the TIMD mode. Accordingly, even if the current block is not a DIMD mode, since the DIMD prediction mode will not be considered afterwards when configuring MPM candidates or deriving the TIMD mode, the inefficient multiple selection of the coding mode may be prevented.

Additionally, according to an embodiment, when the DIMD prediction mode is derived as one directional prediction mode, and when the current block is not a DIMD mode, proposed herein is a method of not designating the DIMD prediction mode as a prediction mode of the current block. That is, when the DIMD prediction mode is derived as one directional prediction mode, and when the current block is not coded by using the DIMD mode, proposed herein is a method of not designating the DIMD prediction mode as a prediction mode of the current block.

For example, not only is the DIMD prediction mode not considered as an MPM candidate or TIMD candidate but the DIMD prediction mode is also not included in remaining modes. Thus, the multiple coding method of the same mode may be completely prevented. In other words, when the DIMD prediction mode is derived as a one directional prediction mode and the current block is not the DIMD mode, the DIMD prediction mode may not be included in the remaining modes as well. Accordingly, when the current block is not the DIMD mode, and when the DIMD prediction mode is derived as one directional prediction mode, since the DIMD prediction mode cannot be selected as a prediction mode of the current block, the inefficient multiple selection of the coding mode may be prevented.

Figure 14:
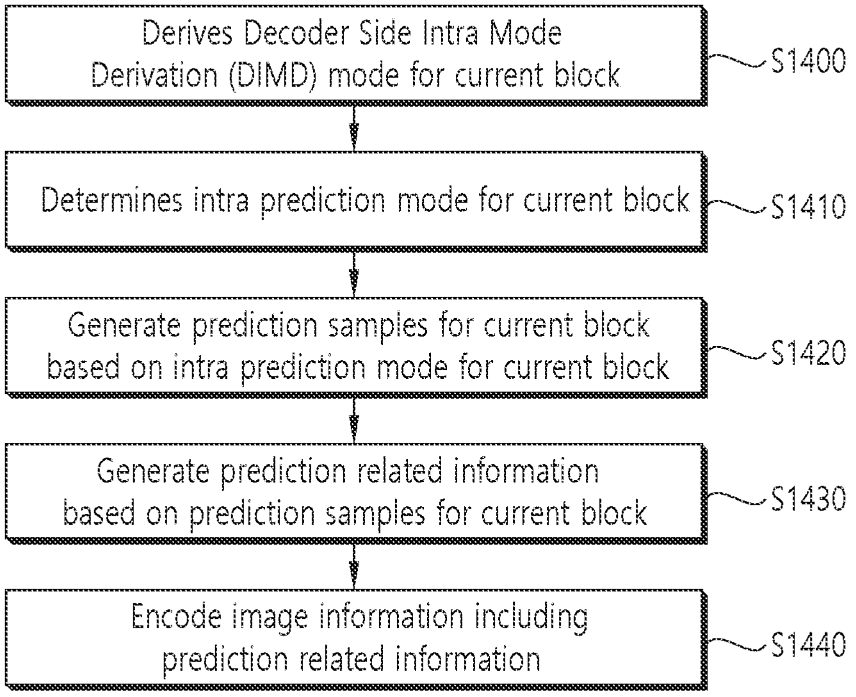
FIG. 14 and FIG. 15 schematically illustrates an example of a video/image encoding method and related components according to an embodiment of the present disclosure.
Figure 15:
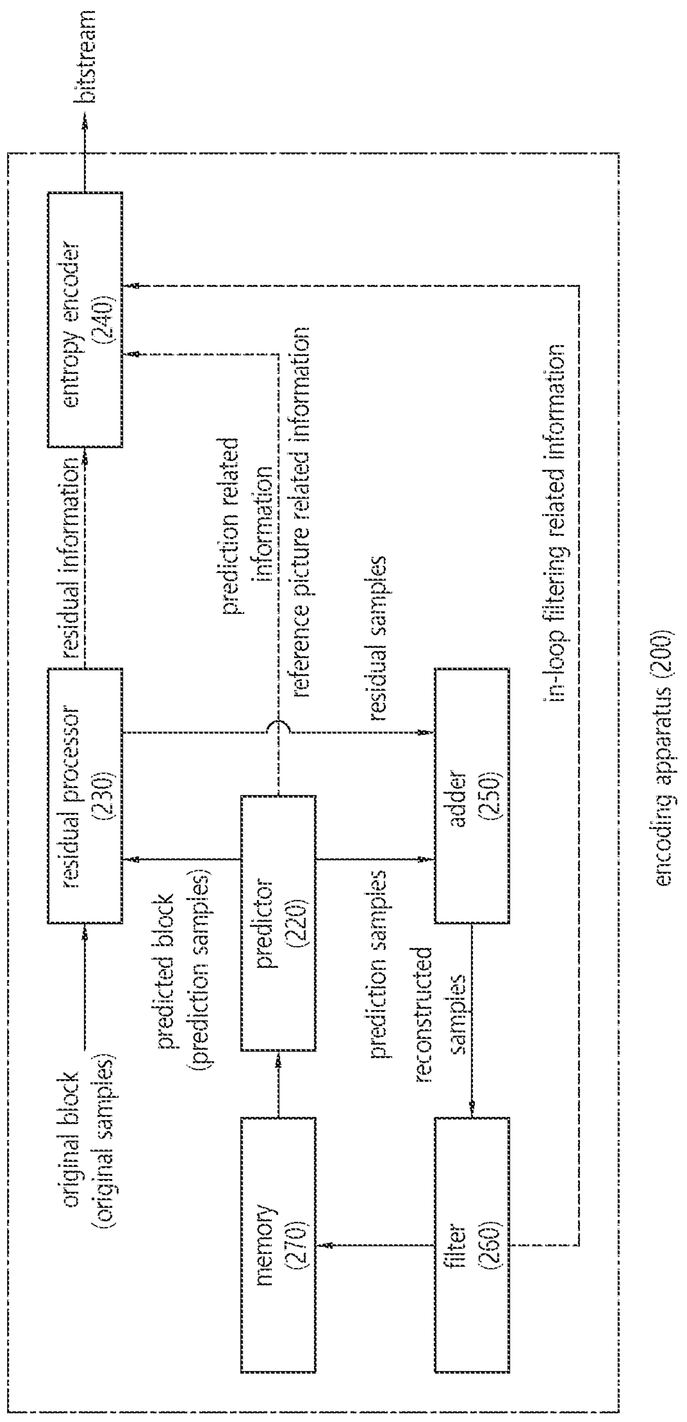

FIG. 14 and FIG. 15 schematically illustrates an example of a video/image encoding method and related components according to an embodiment of the present disclosure.

The method disclosed in FIG. 14 may be performed by the encoding apparatus disclosed in FIG. 2 or FIG. 15. More specifically, for example S1400 to S1430 of FIG. 14 may be performed by the predictor 220 of the encoding apparatus, and S1440 may be performed by the entropy encoder 240 of the encoding apparatus. Additionally, although it is not illustrated in FIG. 14, a process of generating residual samples based on prediction samples for a current block and generating residual information based on the residual samples may be performed by the residual processor 230 of the encoding apparatus, and a process of generating a bitstream from the residual information or prediction related information may be performed by the entropy encoder 240 of the encoding apparatus. The method disclosed in FIG. 14 may include the embodiments that are described above in the present disclosure.

Referring to FIG. 14, the encoding apparatus derives a Decoder Side Intra Mode Derivation (DIMD) mode for a current block (S1400). For example, the encoding apparatus may derive a DIMD mode for the current block according to the above-described embodiment.

The encoding apparatus determines an intra prediction mode for the current block (S1410). For example, the encoding apparatus may determine the intra prediction mode for the current block according to the above-described embodiment.

For example, the intra prediction mode for the current block may be determined based on whether or not the DIMD mode is applied to the current block.

Based on the DIMD mode not being applied to the current block, a default mode of the DIMD mode may be one of a DC mode, a horizontal prediction mode or vertical prediction mode, and a directional prediction mode.

For example, based on the DIMD mode being derived as one directional intra mode and the DIMD mode being applied to the current block, a prediction mode may be derived based on performing weighted average calculation based on the one directional intra mode and planar mode, and the intra prediction mode for the current block may be determined based on the prediction mode. At this point, the intra prediction mode for the current block may be determined based on the prediction mode. Additionally, a weighted value for the one directional intra mode may be ⅔ and a weighted value for the planar mode may be ⅓, and the weighted average calculation may be performed by using various weighted values.

Additionally, the encoding apparatus may configure a Most Probable Mode (MPM) list including intra prediction mode candidates for the current block.

For example, based on the DIMD mode being derived as one directional intra mode and the DIMD mode not being applied to the current block, a prediction mode may be derived based on performing weighted average calculation based on the one directional intra mode and planar mode. At this point, the prediction mode may be included in the MPM list, and the intra prediction mode for the current block may be determined based on the MPM list.

On the other hand, based on the DIMD mode being derived as one directional intra mode and the DIMD mode not being applied to the current block, the one directional intra mode may not be included in the MPM list. At this point, the intra prediction mode for the current block may be determined based on the MPM list.

Additionally, for example, based on the DIMD mode being derived as one directional intra mode and the DIMD mode not being applied to the current block, the one directional intra mode may not be included in the MPM list. In this case, the image information may include remaining mode information, remaining intra prediction modes excluding the intra prediction mode candidates included in the MPM list and the one directional intra mode may be derived based on the remaining mode information, and the intra prediction mode for the current block may be determined based on the remaining intra prediction modes. That is, when the DIMD mode is derived as one directional intra mode and the DIMD mode is not applied to the current block, the DIMD mode may not be included in the MPM list and may not be included in the remaining modes as well.

Additionally, the encoding apparatus may derive a TIMD mode for the current block.

For example, based on the DIMD mode being derived as one directional intra mode and the DIMD mode not being applied to the current block, the TIMD mode may be derived based on intra prediction modes excluding the one directional intra mode. At this point, the intra prediction mode for the current block may be determined based on the TIMD mode.

The encoding apparatus may generate prediction samples for the current block based on the intra prediction mode for the current block (S1420). For example, according to the above-described embodiment, prediction samples for the current block may be generated based on the intra prediction mode for the current block.

The encoding apparatus may generate prediction related information based on the prediction samples for the current block (S1430). For example, according to the above-described embodiment, prediction related information may be generated based on the prediction samples for the current block.

The encoding apparatus may encode image information including the prediction related information (S1440). For example, according to the above-described embodiment, image information including the prediction related information may be encoded.

Additionally, for example, the encoding apparatus may generate prediction samples for the current block based on the intra prediction mode that is determined according to the above-described embodiment, and the encoding apparatus may derive residual samples for the current block based on the prediction samples for the current block. Additionally, the encoding apparatus may generate residual information based on the residual samples. Furthermore, the encoding apparatus may encode image information including remaining mode information and residual information for the current block according to the above-described embodiment.

Figure 16:
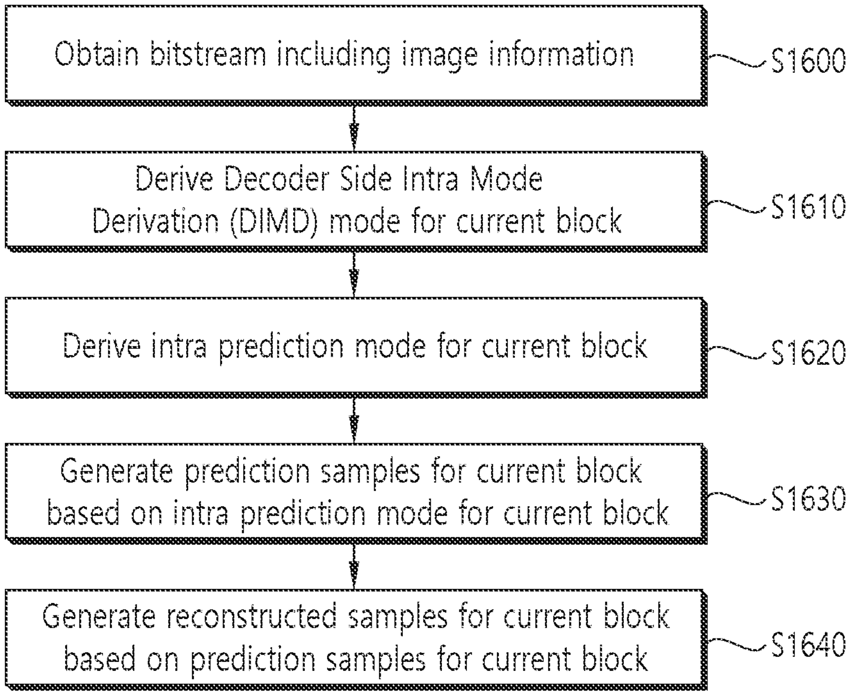
FIG. 16 and FIG. 17 schematically illustrates an example of a video/image decoding method and related components according to an embodiment of the present disclosure.
Figure 17:
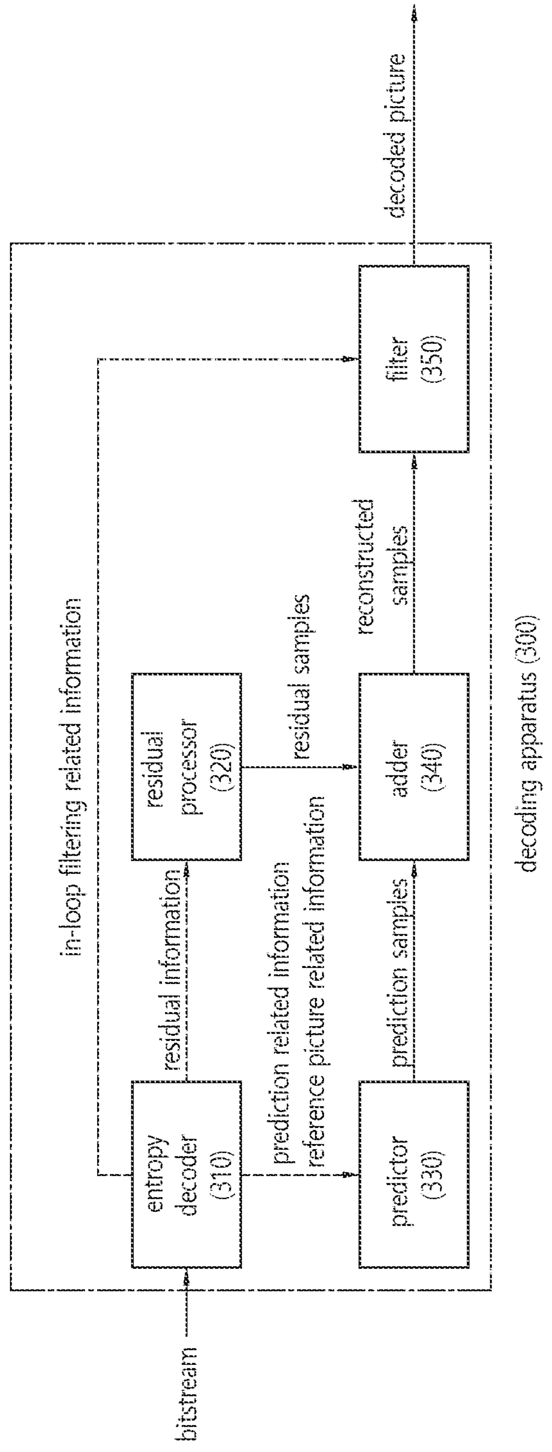

FIG. 16 and FIG. 17 schematically illustrates an example of a video/image decoding method and related components according to an embodiment of the present disclosure.

The method disclosed in FIG. 16 may be performed by the decoding apparatus disclosed in FIG. 3 or FIG. 17. More specifically, for example, S1600 may be performed by the entropy decoder 310 of the decoding apparatus. S1610 to S1630 may be performed by the predictor 330 of the decoding apparatus, and S1640 may be performed by the adder 340 of the decoding apparatus. Additionally, although it is not illustrated in FIG. 16, a process of generating residual samples may be performed by the residual processor 320 of the decoding apparatus, and a process of generating reconstructed samples based on prediction samples and residual samples may be performed by the adder of the decoding apparatus. Additionally, the method disclosed in FIG. 16 may include the embodiments that are described above in the present disclosure.

Referring to FIG. 16, the decoding apparatus obtains a bitstream including image information (S1600). For example, the decoding apparatus may obtain a bitstream including image information according to the above-described embodiment.

The decoding apparatus derives a Decoder Side Intra Mode Derivation (DIMD) mode for a current block (S1610). For example, the decoding apparatus may derive a DIMD mode for the current block according to the above-described embodiment.

The decoding apparatus derives an intra prediction mode for the current block (S1620). For example, the decoding apparatus may derive an intra prediction mode for the current block according to the above-described embodiment.

For example, the intra prediction mode for the current block may be derived based on whether or not the DIMD mode is applied to the current block.

Based on the DIMD mode not being applied to the current block, a default mode of the DIMD mode may be one of a DC mode, a horizontal prediction mode or vertical prediction mode, and a directional prediction mode.

For example, based on the DIMD mode being derived as one directional intra mode and the DIMD mode being applied to the current block, a prediction mode may be derived based on performing weighted average calculation based on the one directional intra mode and planar mode, and the intra prediction mode for the current block may be derived based on the prediction mode. At this point, the intra prediction mode for the current block may be derived based on the prediction mode. Additionally, a weighted value for the one directional intra mode may be ⅔ and a weighted value for the planar mode may be ⅓, and the weighted average calculation may be performed by using various weighted values.

Additionally, the decoding apparatus may configure a Most Probable Mode (MPM) list including intra prediction mode candidates for the current block.

For example, based on the DIMD mode being derived as one directional intra mode and the DIMD mode not being applied to the current block, a prediction mode may be derived based on performing weighted average calculation based on the one directional intra mode and planar mode. At this point, the prediction mode may be included in the MPM list, and the intra prediction mode for the current block may be derived based on the MPM list.

On the other hand, based on the DIMD mode being derived as one directional intra mode and the DIMD mode not being applied to the current block, the one directional intra mode may not be included in the MPM list. At this point, the intra prediction mode for the current block may be derived based on the MPM list.

Additionally, for example, based on the DIMD mode being derived as one directional intra mode and the DIMD mode not being applied to the current block, the one directional intra mode may not be included in the MPM list. In this case, the image information may include remaining mode information, and remaining intra prediction modes excluding the intra prediction mode candidates included in the MPM list and the one directional intra mode may be derived based on the remaining mode information, and the intra prediction mode for the current block may be derived based on the remaining intra prediction modes. That is, when the DIMD mode is derived as one directional intra mode and the DIMD mode is not applied to the current block, the DIMD mode may not be included in the MPM list and may not be included in the remaining modes as well.

Additionally, the decoding apparatus may derive a TIMD mode for the current block.

For example, based on the DIMD mode being derived as one directional intra mode and the DIMD mode not being applied to the current block, the TIMD mode may be derived based on intra prediction modes excluding the one directional intra mode. At this point, the intra prediction mode for the current block may be derived based on the TIMD mode.

The decoding apparatus may generate prediction samples for the current block based on the intra prediction mode for the current block (S1630). For example, according to the above-described embodiment, the decoding apparatus may generate prediction samples for the current block based on the intra prediction mode for the current block.

The decoding apparatus may generate reconstructed samples for the current block based on the prediction samples for the current block (S1640). For example, according to the above-described embodiment, the decoding apparatus may generate reconstructed samples for the current block based on the prediction samples for the current block.

For example, the decoding apparatus may generate reconstructed samples of the current block based on prediction samples and residual samples of the current block. At this point, the residual samples may be derived based on residual related information, and the residual related information may be included image information that is signaled through the bitstream, and the residual related information may be derived from the image information.

According to the above-described present disclosure, when the DIMD mode is not applied to the current block, by configuring the default mode of the DIMD mode by excluding the planar mode, various candidate prediction modes may be used when configuring the MPM candidates for the intra prediction. Thus, an efficient intra prediction may be performed.

Additionally, according to another embodiment of the present disclosure, when the DIMD mode is derived as one directional prediction mode, a prediction mode may be derived by using a weighted average with the planar mode. Thus, by using various candidate prediction modes when configuring the MPM candidates for the intra prediction, an efficient intra prediction may be performed.

Additionally, according to another embodiment of the present disclosure, when the DIMD mode is derived as one directional prediction mode, and when the DIMD mode is not applied to the current block, by not considering the DIMD mode as an MPM candidate, or a TIMD mode candidate, or a remaining mode candidate, intra prediction may be performed more efficiently, and accuracy in the prediction may be enhanced.

The decoding apparatus may receive information on the residual of the current block when residual samples of the current block are present. The information on the residual may include transform coefficients on residual samples. The decoding apparatus may derive residual samples (or residual sample array) for the current block based on the residual information. Specifically, the decoding apparatus may derive quantized transform coefficients based on residual information. Quantized transform coefficients may have a one-dimensional vector form based on a coefficient scanning order. The decoding apparatus may derive transform coefficients based on a dequantization process for the quantized transform coefficients. The decoding apparatus may derive residual samples based on transform coefficients.

The decoding apparatus may generate reconstructed samples based on (intra) prediction samples and residual samples, and may derive a reconstructed block or a reconstructed picture based on the reconstructed samples. Specifically, the decoding apparatus may generate reconstructed samples based on the sum of (intra) prediction samples and residual samples. As described above, the decoding apparatus may then apply an in-loop filtering process such as deblocking filtering and/or SAO process to the reconstructed picture in order to improve subjective/objective picture quality, if necessary.

For example, the decoding apparatus may decode a bitstream or encoded information to obtain image information including all or some of the above information (or syntax elements). In addition, the bitstream or encoded information may be stored in a computer-readable storage medium, and may cause the above-described decoding method to be performed.

In the above-described embodiment, the methods are described based on the flowchart having a series of steps or blocks. The disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the embodiments of this document may be implemented in the form of software, and the encoding apparatus and/or decoding apparatus according to this document may be included in, for example, a TV, computer, smartphone, set-top box, display device, etc. that that performs the processing.

When the embodiments in this document are implemented as software, the above-described method may be implemented as a module (process, function, etc.) that performs the above-described functions. A module can be stored in memory and executed by a processor. The memory may be internal or external to the processor, and may be coupled with the processor in a variety of well-known means. A processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in this document may be implemented and performed on a processor, microprocessor, controller, or chip. For example, functional units shown in each drawing may be implemented and performed on a computer, processor, microprocessor, controller, or chip. In this case, information for implementation (eg. information on instructions) or an algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle (including autonomous vehicles) user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the embodiment(s) present disclosure is applied may be produced in the form of a program that is to be executed by a computer and may be stored in a computer-readable recording medium. Multimedia data having a data structure according to the embodiment(s) of the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM. CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiment(s) of the present disclosure may be implemented with a computer program product according to program codes, and the program codes may be performed in a computer by the embodiment(s) of the present disclosure. The program codes may be stored on a carrier which is readable by a computer.

Figure 18:
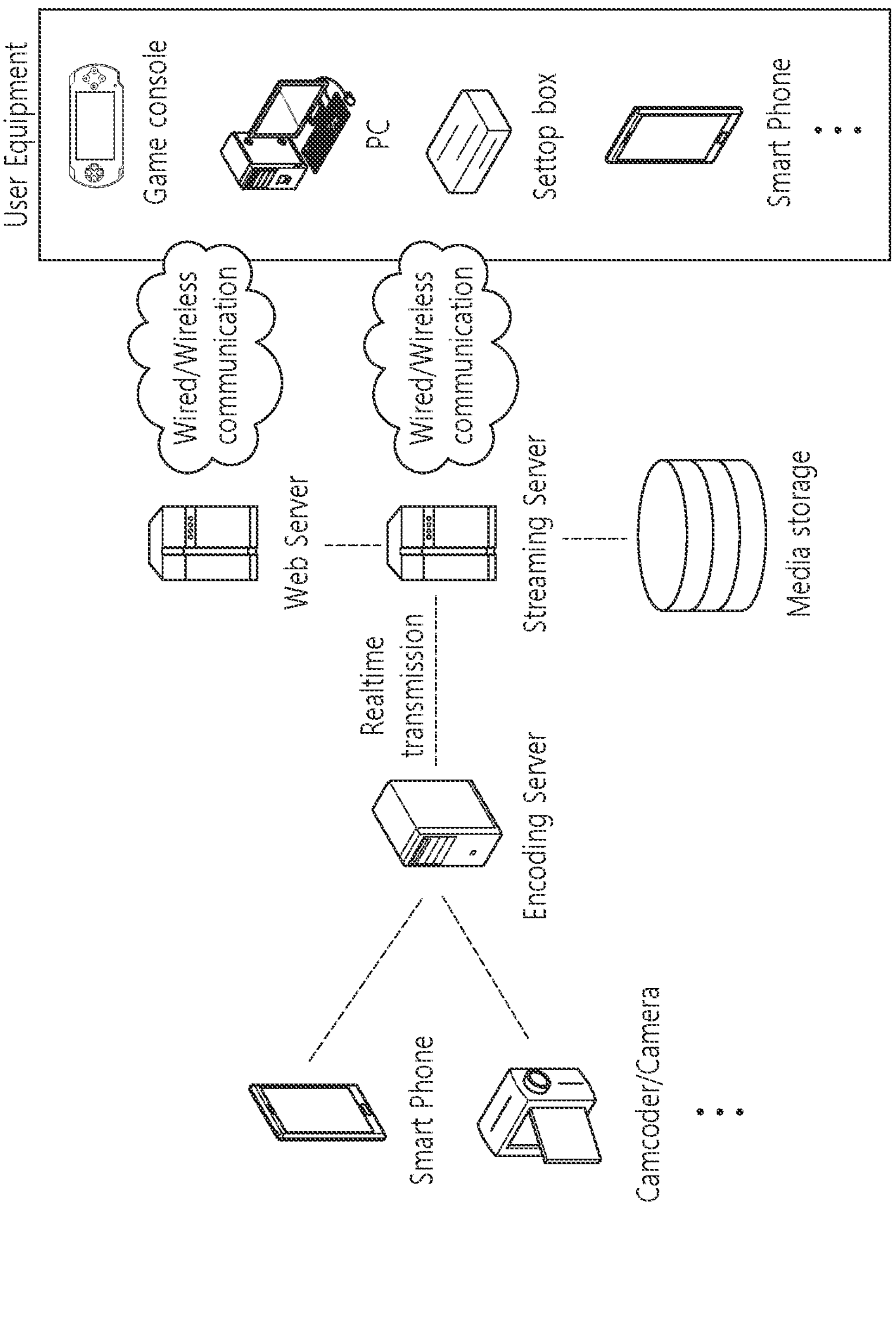
FIG. 18 illustrates an example of a content streaming system to which embodiments disclosed in the present disclosure may be applied.

FIG. 18 illustrates an example of a content streaming system to which embodiments disclosed in the present disclosure may be applied.

Referring to FIG. 18, the content streaming system to which the embodiments of the present disclosure are applied may broadly include an encoding server, a streaming server, a web server, a media storage, a user apparatus, and a multimedia input apparatus.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like.

Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the image decoding method comprising:

obtaining a bitstream including image information;

deriving a Decoder Side Intra Mode Derivation (DIMD) mode for a current block;

configuring a Most Probable Mode (MPM) list including intra prediction mode candidates for the current block;

deriving an intra prediction mode for the current block;

generating prediction samples for the current block based on the intra prediction mode for the current block; and generating reconstructed samples for the current block based on the prediction samples for the current block, wherein the intra prediction mode for the current block is derived based on whether the DIMD mode is applied to the current block, wherein, based on the DIMD mode being not derived, a predetermined default mode other than a planar mode is included in the MPM list as the DIMD mode, and wherein the intra prediction mode for the current block is derived based on the MPM list.

2. The image decoding method of claim 1, wherein, based on the DIMD mode being derived as one directional intra mode and the DIMD mode being applied to the current block, a prediction mode is derived based on performing weighted averaging based on the one directional intra mode and planar mode, and wherein the intra prediction mode for the current block is derived based on the prediction mode.

3. The image decoding method of claim 2, wherein a weighting factor for the one directional intra mode is equal to ⅔ and a weighting factor for the planar mode is equal to ⅓.

4. The image decoding method of claim 1, wherein, based on the DIMD mode being derived as one directional intra mode and the DIMD mode not being applied to the current block, a prediction mode is derived based on performing weighted averaging based on the one directional intra mode and planar mode, wherein the prediction mode is included in the MPM list.

5. The image decoding method of claim 1, further comprising:

deriving a Template-based Intra Mode Derivation (TIMD) mode for the current block, wherein, based on the DIMD mode being derived as one directional intra mode and the DIMD mode not being applied to the current block, the TIMD mode is derived based on an intra prediction mode excluding the one directional intra mode, and wherein the intra prediction mode for the current block is derived based on the TIMD mode.

6. The image decoding method of claim 1, wherein the image information includes remaining mode information, wherein remaining intra prediction modes excluding the intra prediction mode candidates included in the MPM list and the one directional intra mode are derived based on the remaining mode information, and wherein the intra prediction mode for the current block is derived based on the remaining intra prediction modes.

7. An image encoding method performed by an encoding apparatus, the image encoding method comprising:

deriving a Decoder Side Intra Mode Derivation (DIMD) mode for a current block;

configuring a Most Probable Mode (MPM) list including intra prediction mode candidates for the current block, determining an intra prediction mode for the current block;

generating prediction samples for the current block based on the intra prediction mode for the current block;

generating prediction related information based on the prediction samples for the current block; and encoding image information including the prediction related information, wherein the intra prediction mode for the current block is determined based on whether the DIMD mode is applied to the current block, wherein, based on the DIMD mode being not derived, a predetermined default mode other than a planar mode is included in the MPM list as the DIMD mode, and wherein the intra prediction mode for the current block is determined based on the MPM list.

8. The image encoding method of claim 7, wherein, based on the DIMD mode being derived as one directional intra mode and the DIMD mode being applied to the current block, a prediction mode is derived based on performing weighted averaging based on the one directional intra mode and planar mode, and wherein the intra prediction mode for the current block is determined based on the prediction mode.

9. The image encoding method of claim 8, wherein a weighting factor for the one directional intra mode is equal to ⅔ and a weighting factor for the planar mode is equal to ⅓.

10. The image encoding method of claim 7, wherein, based on the DIMD mode being derived as one directional intra mode and the DIMD mode not being applied to the current block, a prediction mode is derived based on performing weighted averaging based on the one directional intra mode and planar mode, wherein the prediction mode is included in the MPM list.

11. A non-transitory computer readable storage medium storing a bitstream generated by an image encoding method of claim 7.

12. A transmission method of data for an image, the transmission method comprising:

obtaining a bitstream, wherein the bitstream is generated based on the deriving a Decoder Side Intra Mode Derivation (DIMD) mode for a current block, configuring a Most Probable Mode (MPM) list including intra prediction mode candidates for the current block, determining an intra prediction mode for the current block, generating prediction samples for the current block based on the intra prediction mode for the current block, generating prediction related information based on the prediction samples for the current block, and encoding image information including the prediction related information; and transmitting the data comprising the bitstream, wherein the intra prediction mode for the current block is determined based on whether the DIMD mode is applied to the current block, wherein, based on the DIMD mode being not derived, a predetermined default mode other than a planar mode is included in the MPM list as the DIMD mode, and wherein the intra prediction mode for the current block i.

13. The image decoding method of claim 1, wherein, based on the DIMD mode being derived as one directional intra mode and the DIMD mode not being applied to the current block, the one directional intra mode is not included in the MPM list.

14. The image encoding method of claim 7, wherein, based on the DIMD mode being derived as one directional intra mode and the DIMD mode not being applied to the current block, the one directional intra mode is not included in the MPM list.

* * * * *